United States Patent [19]
Frohbach

[11] 4,107,735
[45] Aug. 15, 1978

[54] TELEVISION AUDIENCE SURVEY SYSTEM PROVIDING FEEDBACK OF CUMULATIVE SURVEY RESULTS TO INDIVIDUAL TELEVISION VIEWERS

[75] Inventor: Hugh F. Frohbach, Sunnyvale, Calif.

[73] Assignee: R. D. Percy & Company, Seattle, Wash.

[21] Appl. No.: 788,719

[22] Filed: Apr. 19, 1977

[51] Int. Cl.² .............................................. H04M 7/02
[52] U.S. Cl. ........................................ 358/84; 325/31; 179/2 AS
[58] Field of Search .................... 358/84; 325/31, 311; 35/48; 346/17, 33; 179/2 AS

[56] References Cited

U.S. PATENT DOCUMENTS

| | | | |
|---|---|---|---|
| 2,712,976 | 7/1955 | Blaustein | 346/33 R |
| 3,693,090 | 9/1972 | Gabriel | 325/31 |
| 3,803,491 | 4/1974 | Osborn | 325/31 |
| 3,947,624 | 3/1976 | Miyake | 325/31 |
| 3,950,618 | 4/1976 | Bloisi | 179/2 AS |

Primary Examiner—Robert L. Richardson
Assistant Examiner—Edward L. Coles

Attorney, Agent, or Firm—Benoit Law Corporation

[57] ABSTRACT

A video program is broadcast to different video display sets in a broadcast reception area for display at the discretion of television viewers in that area. In order to determine the reaction of television viewers to the displayed broadcast video program, a determination of a relative number of sets responding to the particular broadcast is made. A display of the broadcast video program is provided with a pictorial representation of the relative number of responding sets. Potentially participating sets may be provided with a facility for registering any of a predetermined number of different types of viewer reactions to the broadcast video program. A display of the broadcast video program may be provided with a facility for displaying a number of pictorial representations corresponding to the predetermined number of different types of viewer reactions for individually indicating each viewer reaction type. Viewer reactions received through the registering facility may be displayed in the display of the broadcast video program according to reaction type through the corresponding pictorial representations.

49 Claims, 8 Drawing Figures

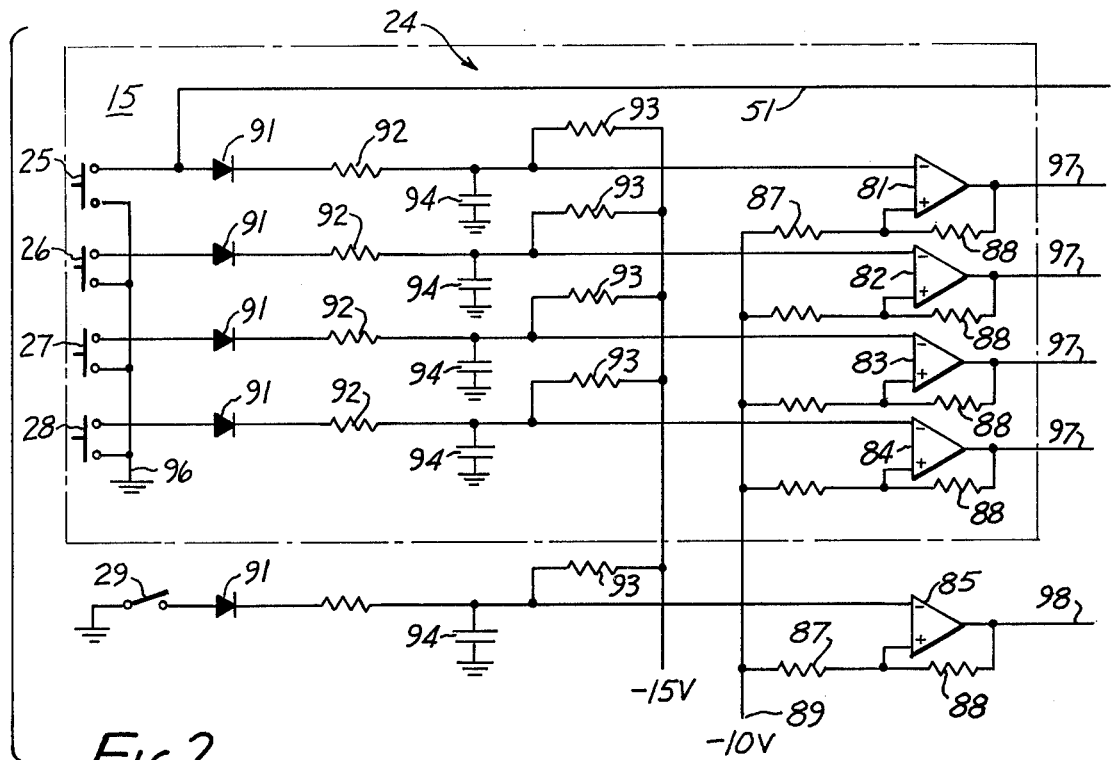
FIG.2
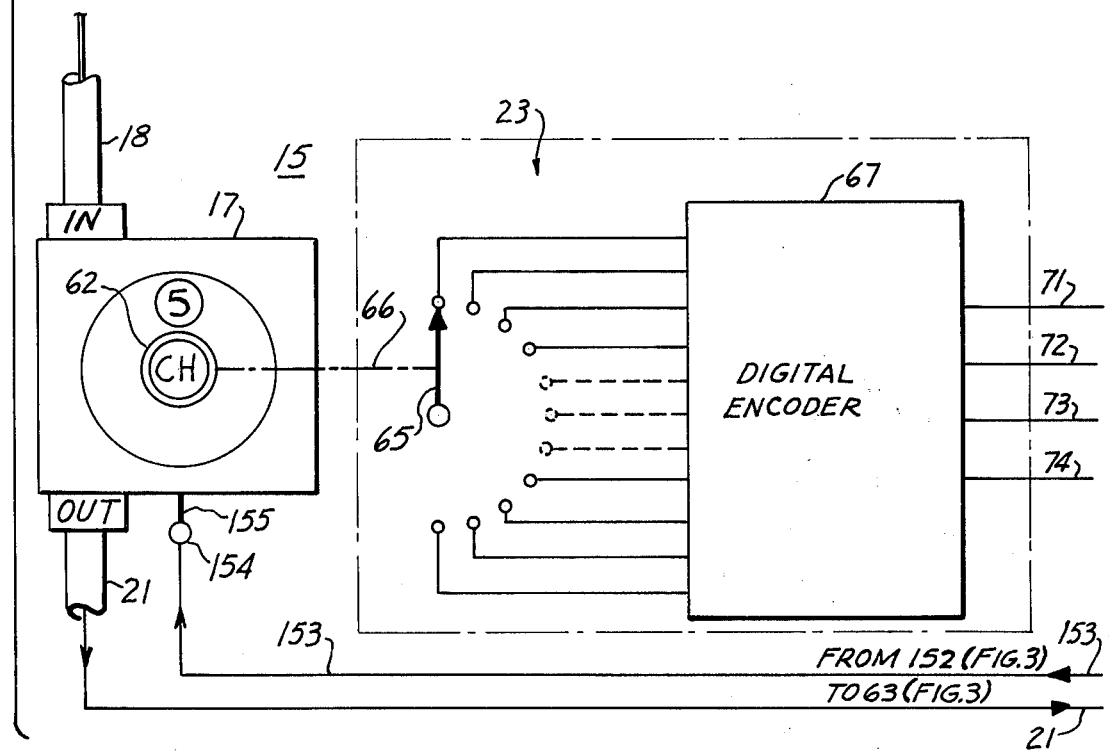

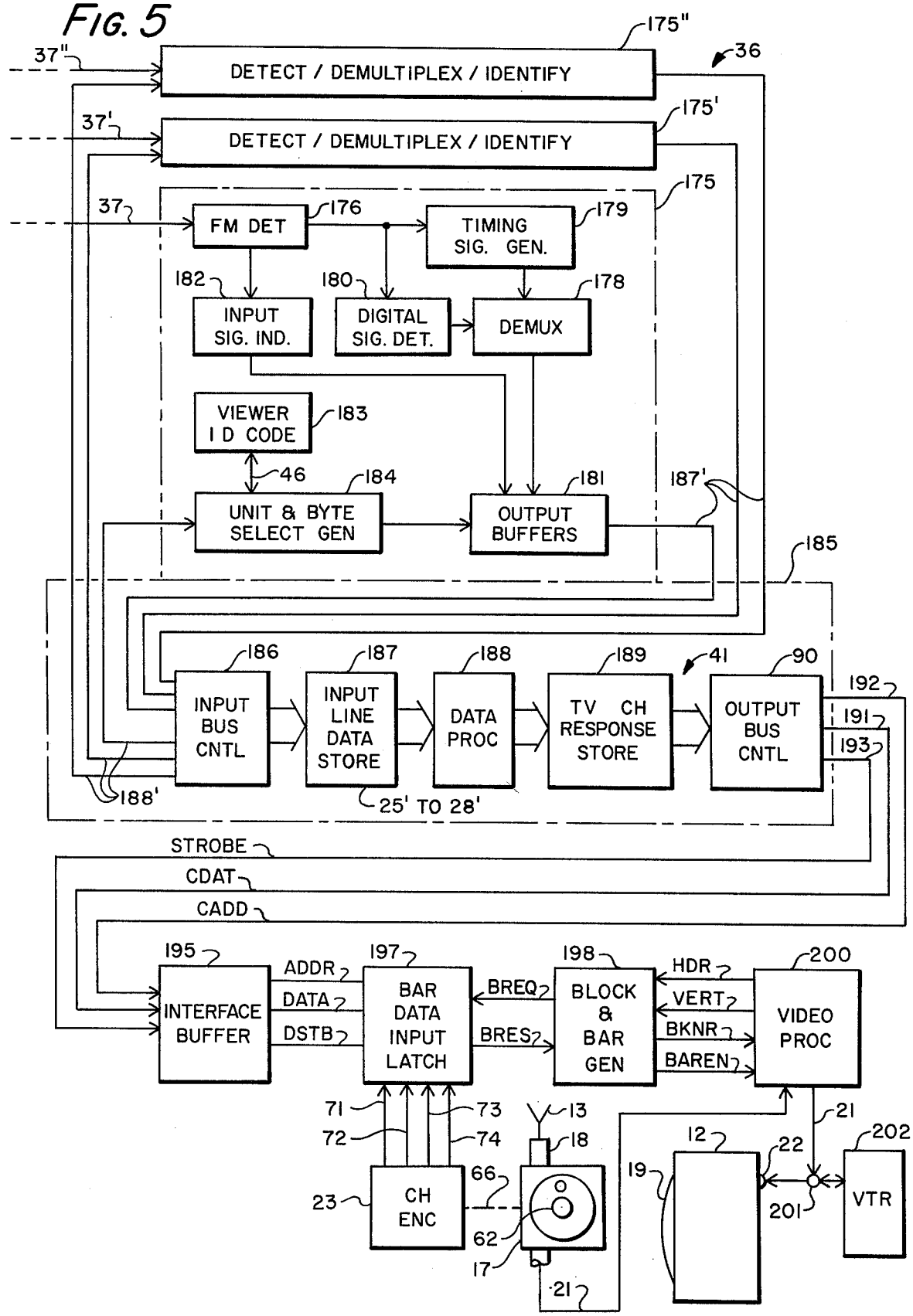

broadcasting the video program to the sets for display at the discretion of television viewers in the area, providing potentially participating sets with a facility for registering any of a predetermined number of different types of viewer reactions to the broadcast video program, providing a display of the broadcast video program, providing the display with a facility for displaying a number of pictorial representations corresponding to the predetermined number of different types of viewer reactions for individually indicating each viewer reaction type, receiving the types of viewer reactions through the registering facility, and displaying in the display received viewer reactions according to reaction type through the corresponding pictorial representations.

From another aspect thereof, the subject invention resides in a method of determining the reaction of television viewers to a video program displayed by different video display sets in a broadcast reception area. The invention according to this aspect resides in the improvement comprising in combination the steps of broadcasting the video program to the sets for display at the discretion of television viewers in the area, providing potentially participating sets with a facility for registering any of a predetermined number of different types of viewer reactions to the broadcast video program, providing a facility for displaying to participating television viewers a number of pictorial representations corresponding to the predetermined number of different types of viewer reactions for individually indicating each viewer reaction type, receiving the types of viewer reactions through the registering facility, and displaying to participating television viewers received viewer reactions according to reaction type through the corresponding pictorial presentations.

From another aspect thereof, the subject invention resides in a method of determining the reaction of television viewers to a video program displayed by different video display sets in a broadcast reception area. The invention according to this aspect resides in the improvement comprising in combination the steps of broadcasting the video program to the sets for display at the discretion of television viewers in the area, determining a relative number of the sets responding to the broadcast, and displaying to participating television viewers an indication of the relative number of responding sets.

From another aspect thereof, the subject invention resides in a system for determining the reaction of television viewers to a video program displayed by different video display sets in a broadcast reception area. The invention according to this aspect resides in the improvement comprising, in combination, means for broadcasting the video program to the sets for display at the discretion of television viewers in the area, means for providing a display of the broadcast video program, means operatively associated with the sets for determining a relative number of the sets responding to the broadcast video program, and means operatively associated with the determining means and the display means for providing in the display a pictorial representation of the relative number of responding sets.

From another aspect thereof, the subject invention resides in a system for determining the reaction of television viewers to a video program displayed by different video display sets in a broadcast reception area. The invention according to this aspect resides in the improvement comprising, in combination, means for broadcasting the video program to the sets for display at the discretion of television viewers in the area, means operatively associated with the broadcasting means for providing a display of the broadcast video program, means operatively associated with the display means for displaying a visual graduation system in the display, means operatively associated with the sets for determining a relative number of the sets responding to the broadcast video program, and means operatively associated with the determining means and the display means for displaying in the graduation system a pictorial representation of the reactive number of responding sets.

From another aspect thereof, the subject invention resides in a system for determining the reaction of television viewers to a video program displayed by different video display sets in a broadcast reception area. The invention according to this aspect resides in the improvement comprising, in combination, means for broadcasting the video program to the sets for display at the discretion of television viewers in the area, means operatively associated with potentially participating sets for registering any of a predetermined number of different types of viewer reactions to the broadcast video program, means operatively associated with the broadcasting means for providing a display of the broadcast video program, means operatively associated with the display means for displaying a number of pictorial representations corresponding to the predetermined number of different types of viewer reactions for individually indicating each viewer reaction type, and means operatively associated with the registering means and the pictorial representations displaying means for displaying registered viewer reactions according to reaction type through the corresponding pictorial representations.

From another aspect thereof, the subject invention resides in a system of determining the reaction of television viewers to a video program displayed by different video display sets in a broadcast reception area. The invention according to this aspect resides in the improvement comprising, in combination, means for broadcasting the video program to the sets for display at the discretion of television viewers in the area, means operatively associated with potentially participating sets for registering any of a predetermined number of different types of viewer reactions to the broadcast video program, and means operatively associated with the registering means for displaying to participating television viewers a number of pictorial representations corresponding to the predetermined number of different types of viewer reactions for individually indicating each viewer reaction type, the displaying means including means for displaying to participating television viewers received viewer reactions according to reaction type through the corresponding pictorial presentations.

From another aspect thereof, the subject invention resides in a system for determining the reaction of television viewers to a video program displayed by different video display sets in a broadcast reception area. The invention according to this aspect resides in the improvement comprising, in combination, means for broadcasting the video program to the sets for display at the discretion of television viewers in the area, means operatively associated with the sets for determining a relative number of the sets responding to the broadcast, and means operatively associated with the determining

TELEVISION AUDIENCE SURVEY SYSTEM PROVIDING FEEDBACK OF CUMULATIVE SURVEY RESULTS TO INDIVIDUAL TELEVISION VIEWERS

BACKGROUND OF THE INVENTION

1. Field of the Invention

The subject invention relates to television viewer survey systems and, more specifically, to systems for determining viewing habits of television viewers and television viewer reaction.

2. Description of the Prior Art

The preferences and reactions of broadcast program recipients have practically always been a concern of broadcasters and advertisers. Accordingly, a very large number of proposals and systems exist for determining listening and viewing habits of radio and television broadcast recipients, with and without facilities for registering and determining reactions of radio and television listeners and viewers to received programs.

A similar concern has centered on the reaction of audiences to motion picture displays or other presentations in theatres. An extensive description of such a system is contained in U.S. Pat. No. 2,712,976 by P. H. Blaustein et al, issued July 12, 1955, and herewith incorporated by reference herein.

Only very few of the many proposals have found practical acceptance and severe doubts exist as to the accuracy of even the most widely used viewer reaction determining systems. Yet, the prior art has been unable to evolve more accurate and relevant systems, since the proposals which have attempted to break away from the most widely used viewer reaction determining systems and their drawbacks have, in turn, introduced deficiencies of their own.

For instance, a currently employed viewer reaction determining system averages different types of viewer reactions and generates a numeric indication of such averaging procedures in a display of the particular picture. The above mentioned Blaustein et al patent proposes a variant in which the predominant viewer reaction is indicated by varying colors, such as by way of a color band or a frame around a projected picture varying in color to correspond with the reaction that has been expressed in relation to the various depicted incidence. According to Blaustein et al, the projector may simply be controlled manually by a person having before him a chart script with a broad variable color band of the above mentioned type, with such person then simply shifting a slide within the projector to create a frame around the projected picture which corresponds with the color of the band on the chart identified with the prevalence of a particular reaction at a particular instant.

In practice, systems which rely on averaging of different types of viewer reactions or which limit their output to the predominant viewer reaction are of little, if any, value in surveillances concerned with a genuine improvement of programing and program content and realistic evaluation of actual viewer response and reaction.

In a similar vein, too many prior-art systems are only workable within the confines of a theatre or viewing room in which the audience or viewers to be surveyed are assembled during the particular performance. This imposes further restrictions on many prior-art systems as to their utility and feasibility in a television broadcast environment where viewers are typically scattered throughout a large broadcast reception area in different homes. If one considers only the well-known fact that people will react differently in a large group than individually or in the absence of each other, one can already gain an idea about the far-reaching inutility of viewer response systems which require a gathering of the viewers to be surveyed in a theatre or viewing room.

Existing systems, moreover, suffer from a lack of viewer participation incentive. In particular, many viewers tire of their participation for lack of an assuring indication to them that their contribution matters and is meaningful.

SUMMARY OF THE INVENTION

It is broadly an object of this invention to overcome the above mentioned disadvantages.

It is a related object of this invention to provide improved systems for determining the viewing habits of television viewers.

It is a germane object of this invention to provide improved systems for determining reactions of television viewers to broadcast programs.

It is also an object of this invention to provide improved methods and apparatus for television viewer survey systems.

It is also an object of this invention to provide improved methods and systems for determining the reaction of television viewers to a video program displayed by different video display sets in a broadcast reception area.

It is a further object of this invention to encourage increased and more meaningful viewer participation.

Other objects will become apparent in the further course of this disclosure.

From a first aspect thereof, the subject invention resides in a method of determining the reaction of television viewers to a video program displayed by different video display sets in a broadcast reception area. The invention according to this aspect resides in the improvement comprising in combination the steps of broadcasting the video program to the sets for display at the discretion of television viewers in said area, providing a display of the broadcast video program, determining a relative number of the sets responding to the broadcast video program, and providing in the display a pictorial representation of the relative number of responding sets.

From another aspect thereof, the subject invention resides in a method of determining the reaction of television viewers to a video program displayed by different video display sets in a broadcast reception area. The invention according to this aspect resides in the improvement comprising in combination the steps of broadcasting the video program to the sets for display at the discretion of television viewers in the area, providing a display of the broadcast video program, displaying a visual graduation system in the display, determining a relative number of the sets responding to the broadcast video program, and providing in the graduation system in the display a pictorial representation of the relative number of responding sets.

From another aspect thereof, the subject invention resides in a method of determining the reaction of television viewers to a video program displayed by different video display sets in a broadcast reception area. The invention according to this aspect resides in the improvement comprising in combination the steps of position. No protection is herein claimed for this feature per se, since channel switching remote controls for television sets are old as such.

Also, it should be understood that the practice of the subject invention is not limited to use of the remote channel control shown in FIG. 1 et seq., but extends to other types of channel tuning, such as tuning at the television receiver set itself.

The channel on which a particular broadcast is being received is determined for each broadcast displayed by the television set 12, and such determination of the channel is polled for an evaluation or determination of the viewing habits of television viewers in a multi-channel television broadcast reception area.

In particular, a sensor 23 is coupled to the remote control 15 for determining for each broadcast displayed by the television set 12 the channel on which that broadcast is being received. The sensor 23 may preferably be included in the remote control.

The system 10 according to the preferred embodiment illustrated in FIG. 1 also includes a second manually actuable device 24 located in the remote control 15 in addition to and adjacent the remote manually actuable channel tuner 17. The device 24 may have a keyboard or other manually actuable input means for receiving television viewer reactions to broadcasts displayed by the television set 12 on the video tube or screen 19.

As indicated in FIG. 1, the viewer reaction device 24 may, for instance, have four push buttons 25 to 28 for enabling the viewer to register his or her reaction to a displayed program on a graduated scale from very unfavorable to very favorable, or within any other predetermined pattern of possible responses.

As a convenience, the remote control 15 may also have an on-off switch 31 which, for instance, may be located in a circuit extending from a power plug 32, insertable into a wall outlet (not shown), via the power plug 33 and power cord 34 of the set 12. No claim of novelty is herein made for this on-off switching convenience as such.

In practice, the television set 12 and remote control 15 will typically be located in one and the same room 35. On the other hand, a centrally located interrogation unit 36 is connected via lines 37 to the channel determining device or sensor 23 and to the manually actuable reaction receiving device 24 for polling the sensor 23 as to the channel on which a broadcast displayed by the television set 12 is received and for also polling the reaction device 24 as to received viewer reactions to a displayed broadcast received from the polled channel. According to FIGS. 2 and 3 (switch 29, FIG. 2), the centrally located interrogation unit also polls the or each television set as to its on/off condition.

In principle, the interrogating unit 36 could poll the devices 23, 24, and 29 or 31 at very brief intervals so that each channel switching and viewer reaction and each set on/off condition will be picked up. While this is within the broad contemplation of the subject invention, it generally is more practical to provide longer intervals between polling cycles. In that case, it is desirable to provide a memory facility 39 which preferably is combined with or included in the remote control 15 in order to register or memorize the channel determination effected by the sensor 23 and the viewer reactions received by the device 24. The interrogating unit 36 would then interrogate the memory 39 from time to time.

As indicated by a block 41, the interrogator 36 may output each channel determination. The interrogator 36 may also output each received viewer reaction 25' to 28' corresponding to the push buttons 25 to 28. The corresponding channel determinations and viewer reactions may then be recorded in channels 42 and 43 on a magnetic or other recording medium 44 that is advanced by a tape drive 45.

In practice, a plurality of television sets and viewers are served and interrogated by the system 10. By way of example, the FIG. 1 shows several lines 37, 37' and 37" leading to the interrogator 36 from the remote control 15 and from other identical remote controls in the homes of different viewers. As indicated by a dial 46, the interrogator 36 periodically interrogates or polls these different remote controls 15 etc. as to the channel on which a broadcast is being displayed by each television set 12 etc. and as to the viewer reaction received at each remote control 15 etc. As indicated at 48, a signal identifying each polled viewer or television set is recorded in a track 49 in parallel to the corresponding channel and viewer reaction determinations in tracks 42 and 43.

As a special feature in accordance with a preferred embodiment of the subject invention, the system 10 includes a facility for altering the display of a television broadcast in response to a received television viewer reaction manifested by actuation of the second device 24, rather than by actuation of the channel tuner 17.

In particular, if the viewer reaction registered by actuation of any one of the buttons 26 to 28 is considered a first viewer reaction, then the reaction registered by actuation of the button 25 may be considered a second viewer reaction to a television broadcast displayed by the set 12.

As indicated by a line 51 between the button 25 and the channel selector 17, actuation of the button 25 is capable of altering the display of a television broadcast by the set 12 in response to a received second television viewer reaction. By way of example, the alteration of the television broadcast display may take the form of a blanking of the television picture or of another manifestation perceivable by the viewer who has actuated the button 25 of the remote device 15.

Alternatively or additionally, another aspect of the displayed television broadcast may be altered in response to actuation of the button 25. For instance, the push button 25 may be coupled to actuate or open a switch 52 which is in circuit with a line 53 which extends from the output of the audio part 54 of the television set to the remote control 15 and a lead 55 which extends from the remote control 15 to the loudspeaker 56 of the television set 12.

Accordingly, actuation of the push button 25 at the remote control 15 will interrupt the sound accompaniment of the displayed television broadcast to which the viewer has reacted.

In practice, the feature just described has the great advantage of confirming to the viewer in a readily perceptible manner that the manifestation of his reaction exerts a perceptible control on the system.

In terms of practical results, this will make the viewer a more determined and thus valuable participant, than if no perceptible indication of the efficacy of his participation were given. In principle, the system could provide at the television set 12, such as on the display screen 19, a different discernible manifestation of any one of the means for displaying to participating television viewers an indication of the relative number of responding sets.

From another aspect thereof, the subject invention resides in a system for determining the reaction of television viewers to a video program displayed by different video display sets in a broadcast reception area. The invention according to this aspect resides in the improvement comprising, in combination, means for broadcasting the video program over a predetermined television channel to the sets for display at the discretion of television viewers in the area, channel selector means at each potentially participating set for selectively receiving the video program broadcast over the predetermined television channel for display by the particular set, means operatively associated with each potentially participating set for registering different types of viewer reactions to a video program display by the particular set, the registering means including first means in addition to the channel selector means for registering a first type of television viewer reaction to a video program display by the particular set, and second means in addition to the channel selector means and the first means for registering a second type of television viewer reaction to a video program display by the particular set, means coupled to the second means for altering in response to a second type of television viewer reaction registered with respect to a video program display by a particular set the display of that video program by the particular set, and means operatively associated with the viewer reactions registering means of participating sets for separately displaying indications of registered first and second types of television viewer reaction.

The recitation in this specification or in any claim of any method steps or means in any particular order is not necessarily intended to signify any limitation to that recited order. Rather, an order or succession other than a recited order or succession may be observed for any number of method steps or means, as long as such other order or succession is operative, new and useful.

BRIEF DESCRIPTION OF THE DRAWINGS

The invention and its aspects and objects will become more readily apparent from the following detailed description of preferred embodiments thereof, illustrated by way of example in the accompanying drawings, in which like reference numerals designate like or functionally equivalent parts, and in which:

FIGS. 2 and 3, to be positioned side-by-side, present a combined circuit and block diagram of apparatus useful in the system shown in FIG. 1;

FIG. 5 is a block diagram of a system for determining the reaction of television viewers in accordance with a further preferred embodiment of the subject invention.

DESCRIPTION OF PREFERRED EMBODIMENTS

Figure 1:
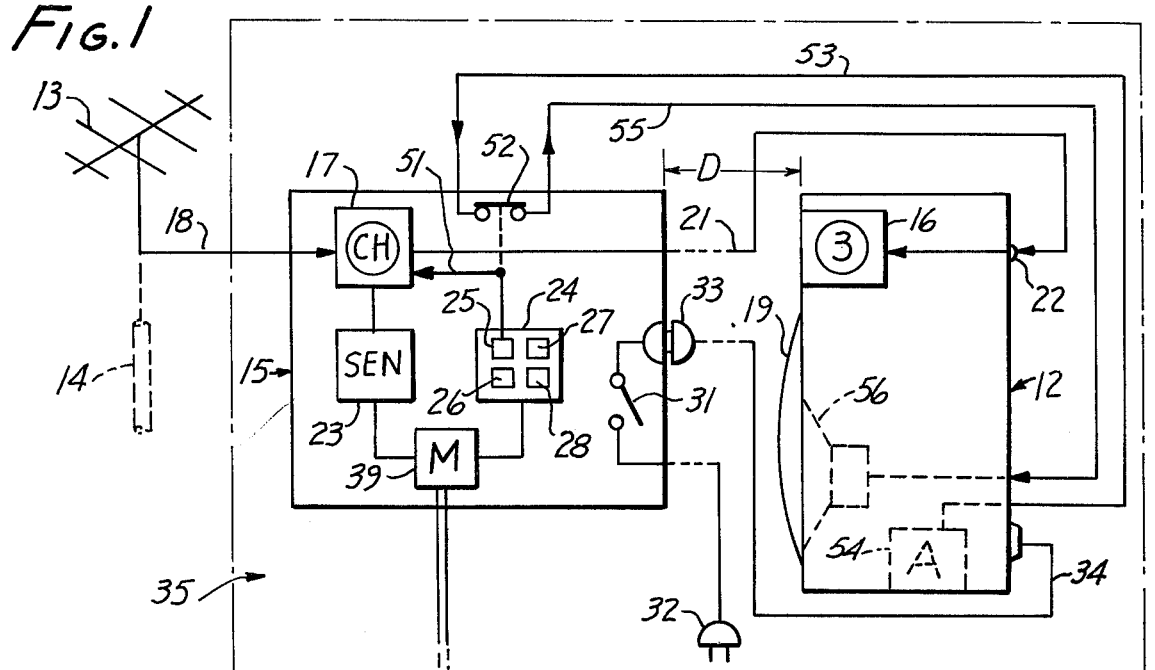
FIG. 1 is a block diagram of a system for determining viewing habits of television viewers.

The illustrated system 10 for determining viewer reaction or viewing habits of television viewers shown in FIG. 1 operates with a conventional television broadcast display set 12 in a multi-channel television broadcast reception area wherein broadcasts from different television stations 11 operating over different transmitters at different frequencies or channels are received via such conventional means as a television antenna 13. Alternatively, the subject invention and its preferred embodiments may be practiced with cable television systems wherein television broadcasts or programs are received at different frequencies or through different channels via a cable 14.

As shown in FIG. 1, the system 10 includes a remote control 15 which is located at a distance D from the television set 12. Typically, the remote control 15 is of the familiar across-the-room television remote control type that is popularly used by television viewers as a convenient means for changing viewing channels and effecting other necessary or desired adjustments of the television set.

Typically, the television set 12, being of a conventional type, would have its own tuner or channel selector 16. However, in the illustrated system, channel selection is not effected by the tuner 16 of the set 12 when the remote control 15 is operated. Rather, the remote control 15 has its own tuner or channel selection facility 17 for changing the channels of the TV set 12.

The antenna or cable leads 18 of the antenna 13 or cable 14 are applied to the channel tuner 17 of the remote control 15 which, being located at a distance D from the television set 12, remotely causes the television set to display with a video display tube 19, a television broadcast received on any one of a predetermined number of channels as determined by the range of the remote control tuner 17 and the availability of channels at the location of the antenna 13 or via the cable 14.

The manually actuable remote control tuner 17 preferably transposes each television broadcast received on any one of the predetermined number of channels to one predetermined channel. In particular, the remote control tuner may be constructed to transpose or convert each received channel, to which the tuner 16 is manually adjusted, to one and the same channel, such as to channel 3.

A cable or other suitable transmission facility is connected to, and extends between, the remote control 15 and the television set 12 for transmitting any television broadcast over the one predetermined transposed or converted channel for display by the television set on the video tube 19.

In particular, the cable extends from the output of the remote control tuner 17 to the input of the local tuner 16 via antenna terminals 22 of the set 12.

It is thus seen that the remote manually actuable channel tuner 17, located at a distance D from the television set 12, selectively receives television broadcasts on any one of the predetermined number of channels receivable via the antenna 13 or cable 14, and that a cable 21 transmits any selectively received television broadcast from the remote tuner 17 over the distance D for display by the television set 12. Each time the viewer wishes to change channels, he or she would manually actuate the remote channel tuner or selector 17 from the convenience of his or her preferred viewing different viewer reactions registered via buttons 25 to 28.

In terms of the illustrated system, it is important to recognize that the disclosed alteration of the display of a television broadcast in response to one or more received viewer reactions is a concomitant of the channel selection and viewer reaction interrogation or polling carried on by the equipment 36, etc.

A practical example of the system of the subject invention is shown in, and will now be described with reference to, FIGS. 2 et seq.

Figure 3:
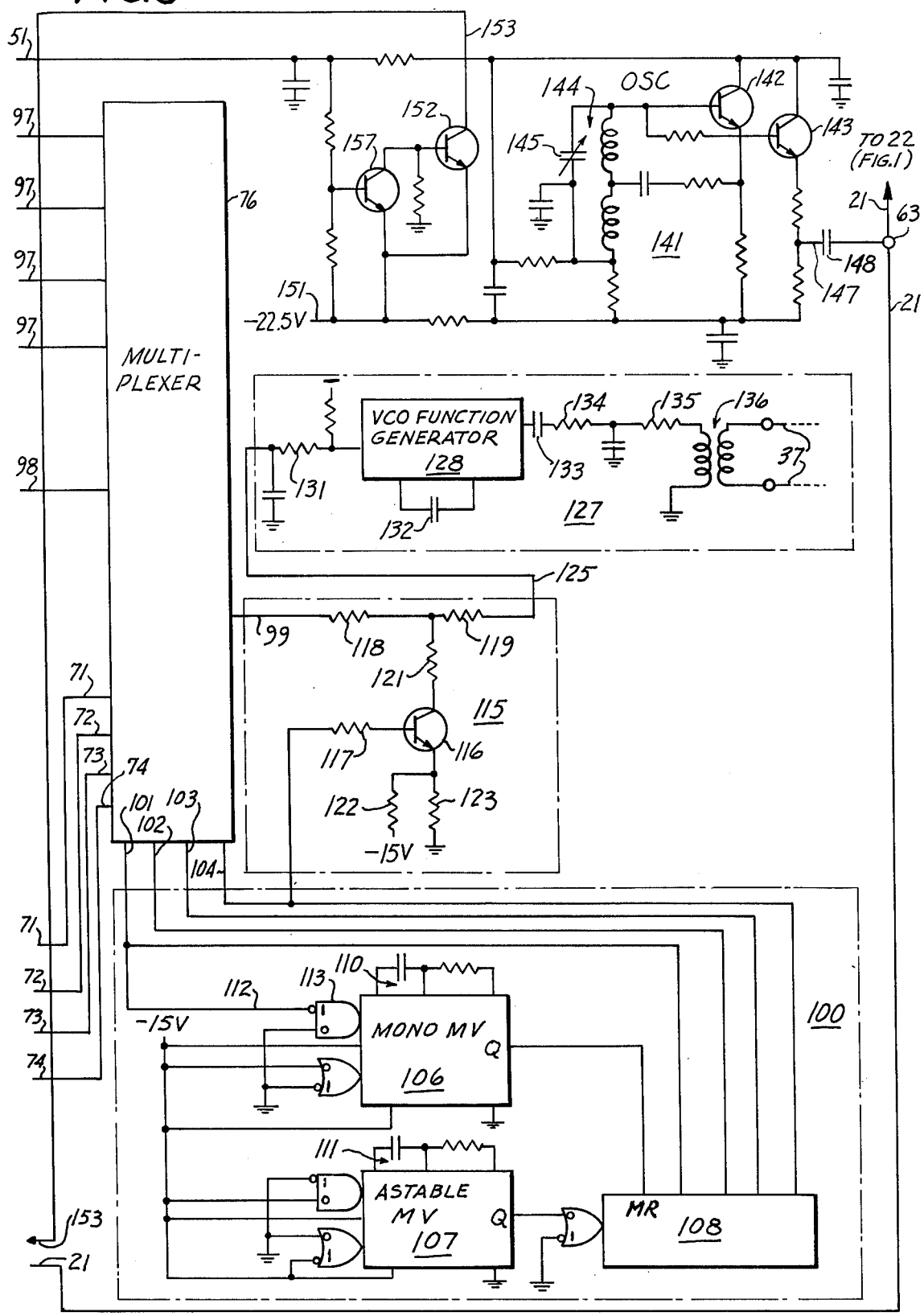

The equipment shown in FIGS. 2 and 3 of the accompanying drawings may all be included in the remote control 15 which, as illustrated in FIG. 1, is located at a distance D from the remotely controlled television set 12. In this respect, at least the first and second manually actuable devices 17 and 24 are located in the remote control 15 at a distance from the television set in accordance with the principles of the illustrated preferred embodiments of the subject invention.

By way of example, the first manually actuable device preferably is a remote channel selector or tuner 17 which accepts television programs on any of the available channels via an input cable 18 and which transposes any of these received broadcasts selectively to a predetermined channel or frequency band. The selection as to which of the available channels is being transposed is made on the basis of appropriate adjustment of the channel selector knob and dial 62 of the remote tuner 17. Any transposed program is applied to the output cable 21 which extends to the antenna terminals 22 of the television set 12 (see FIG. 1) via a tuner or remote control output 63.

The type of remote tuner employed in the practice of the illustrated preferred embodiments of the invention is well known in the television circuitry field, and typically includes conventional circuits with tuning or channel switching means for receiving television broadcasts on any one of the available channels, together with an oscillator for providing a carrier of variable frequency to translate the selected received television broadcast bands to the desired output channel allocation, for example channel 3.

Remote channel selectors of the type of tuner 17 are commercially available and are manufactured by such companies as Jerrold Electronics Corporation.

According to FIG. 2, the channel sensor 23 has a rotary switch 65 ganged with the channel selector knob 62 of the remote tuner 17 as indicated by a phantom line 66.

A digital encoder 67, which may be of a conventional type, encodes the position of the rotary switch 65 and thus any of the channels selected by the remote tuner 17 in the form of a digital signal on four lines 71, 72, 73 and 74 extending from FIG. 2 to inputs of a multiplexer 76 shown in FIG. 3.

By way of example, the multiplexer 76 may be a COS/MOS Analog Multiplexer of the type CD4067B shown, for instance, on pages 553 to 557 of the RCA Integrated Circuits Databook 4-76.

The multiplexer 76 also handles the viewer reactions received via the viewer reaction device 24 and the on/off switch 29.

The viewer reaction registration device 24 comprises the above mentioned push buttons 25 to 28 in combination with corresponding operational amplifiers 81, 82, 83 and 84.

A further operational amplifier 85 cooperates with a switch 29 which indicates the on/off condition of the remote control 15 and television set 12 and, for that purpose, may be ganged with the on/off switch 31 shown in FIG. 1.

By way of example, the operational amplifiers 81 to 85 may be of the type XR-4212, made by EXAR INTEGRATED SYSTEMS, INC., and described, for instance, in their bulletin entitled "XR-4212 Quad Operational Amplifier" and dated April 1976.

Each operational amplifier 81 to 85 has a pair of series-connected resistors 87 and 88 associated therewith. The junction of the resistors 87 and 88 is connected to the non-inverting (+) input of the associated operational amplifier. The free end of each resistor 87 is connected to a terminal 89 to which a negative bias potential is applied. On the other hand, the free end of each resistor 88 is connected to the output of its associated operational amplifier.

Each of the buttons or switches 25 to 29 is individually connected to the inverting (−) input of an associated operational amplifier 81, 82, 83, 84 or 85 via a unidirectional current conducting device or diode 91 and series-connected resistor 92. The inverting (−) input of each operational amplifier, moreover, is biased with a negative potential via a resistor 93 and is provided with a storage capacitor 94. The storage capacitors 94 provide the system with a memory function which stores viewer reactions and the set on/off condition for convenient polling by the interrogating unit 36.

In the illustrated preferred embodiment, each capacitor 94 stores a charge resulting from actuation of its corresponding button or switch 25, 26, 27, 28 or 29 for a sufficient time for polling via multiplexer 76.

As indicated at 96, actuation of each of the viewer reaction push buttons 25 to 28 will ground the line leading to the inverting (−) input of the associated operational amplifier. The signals resulting from such viewer reaction input are applied to the multiplexer 76 via lines 97 extending from FIG. 2 to FIG. 3 in the drawings.

Similarly, closure of the switch 29 will ground the line leading to the inverting (−) input of the operational amplifier 85, and the resulting on signal is applied via a line 98 from the operational amplifier 85 shown in FIG. 2 to the multiplexer 76 shown in FIG. 3.

The multiplexer 76 operates in the manner of a digitally controlled analog switch for a seriatim application of the channel selection, viewer reaction and on/off signals received via lines 71 to 74 and 97 and 98 to a multiplexer output 99. To this end, the multiplexer 76 is controlled by a timing unit 100 having leads 101, 102, 103 and 104 connected to the binary control inputs of the multiplexer.

The illustrated timing unit 100 is composed of a monostable multivibrator 106, an astable multivibrator 107 and a binary counter 108. The multivibrators 106 and 107 are equipped with RC timing elements 110 and 111.

A lead 112 extends from the timing lead 101 to the negative trigger input of the monostable control gate 113 of the multivibrator 106.

By way of example, the multivibrators 106 and 107 may be COS/MOS Monostable/Astable type CD4047AE described, for instance, on pages 470 to 475 of the above mentioned RCA Integrated Circuits Databook.

The Q output of the multivibrator 106 is connected to the master reset input of the binary counter 108. The Q output of the multivibrator 107 is connected to the clock input element of the counter 108. The leads 101 to 104, in turn, issue from four binary Q outputs of the counter 108.

By way of example, the counter 108 may be an internally synchronous binary counter of the type F4520 manufactured by Fairchild Semiconductor Company and described, for instance, on pages 4–173 and 4–174 of their MOS/CCD Data Book of 1975.

The binary output signal of the multiplexer 76 may be subjected to the action of a level alternation switch which alternates the level of the multiplexer output signal with the aid of an NPN transistor 116 having a base electrode connected via a resistor 117 to the least significant output lead 104 of the binary counter 108. The level alternation switch 115 further has two resistors 118 and 119 connected in series to the multiplexer output 99. The collector of the transistor 116 is connected to the junction between the resistors 118 and 119 via a resistor 121. The emitter of the transistor 116 is negatively biased via a resistor 122 and is connected to ground through a resistor 123 having a value about twice as high as the value of the resistor 122.

A lead 125 applies the multiplexed alternated signal to a modulator 127 for preparation of the information concerning selected channel, viewer reaction and condition of the television set for transmission via leads 37 to the central interrogating unit 36. By way of example, the modulator 127 may comprise a function generator 128 including a voltage controlled oscillator. By way of example, the component 28 may comprise the monolithic function generator type XR-2206, manufactured by EXAR INTEGRATED SYSTEMS, INC. and described, for instance, in their 1976 IC Update Master Catalog on pages 630 and 631.

In particular, the switch output signal of the multiplexer 76 is supplied via a resistor 131 to the input of the function generator 128. The voltage controlled oscillator of the function generator 128 is provided with a timing capacitor 132.

The modulated sinusoidal output of the function generator 128 is supplied via a coupling capacitor 133 and series-connected resistors 134 and 135 to the primary winding of the transformer 136 for transmission via the transformer secondary and leads 37 to the central interrogating unit 36. By way of example, the leads 37 may be part of a dedicated telephone line or of another suitable signal transmission channel.

As mentioned previously, and as indicated at 39 in FIG. 1, a memory may be combined with the multiplexer 76 in order to store viewer reactions and channel selections as a function of time for periodic polling by the central interrogating unit via lines 37.

The components of the interrogating unit 36 are not herein shown in detail, as they may be composed of conventional components complementary to the components shown in FIG. 3 and of other conventional means and equipment. For instance, the interrogator 36 may for each signal channel 37 have a component complementary to the function generator 128 or modulator 127 for demodulating the channel indication, viewer reaction and set condition indicating signals to a form similar to the form in which these signals appeared at the multiplexer output 99 or then to any other form desired for convenient polling and evaluation.

Similarly, the interrogator may have circuitry complementary to the multiplexer 76 in order to provide the signals in any desired processable pattern.

In accordance with conventional modern practice, the central interrogator may include conventional computer equipment for controlling and effecting the polling operation over signal lines 37, 37', 37'', etc., concerning the condition and presently active channel of the different participating television sets, as well as the reaction of the different participating television viewers.

Reference may in this connection be had to U.S. Pat. Nos. 3,947,624, 3,950,618, 3,803,491, 3,794,922, 3,744,712, 3,725,603, 3,716,654, 3,506,916, 3,453,641, 3,126,513, 3,058,065, 3,034,707, 2,935,557, 2,864,941, 2,751,449, 2,676,084, 2,660,508, 2,652,310, 2,630,367, 2,514,086, and 2,513,360 all of which are herewith incorporated by reference herein.

The illustrated preferred embodiment shown in FIGS. 2 and 3 also includes a particularly advantageous form of equipment for altering the display of a television broadcast in response to a received viewer reaction manifested by actuation of the viewer reaction device 24 at the remote control 15.

In particular, a lead 51 extends from the push button 25 shown in FIG. 2 to an oscillator 141 shown in FIG. 3 in order to actuate that oscillator upon depression of the push button 25.

The oscillator 141 includes a pair of NPN transistors 142 and 143 combined with an LC circuit 144 which is preferably tuned to a specific television channel of the set 12. A variable capacitor 145 may be employed in the oscillating circuit to tune the oscillator 141 to the center of that specific television channel. In practice, the oscillator 141 is tuned to the channel onto which the remote tuner 17 transposes each received television broadcast as described above.

The output lead 147 of the oscillator 141 is connected via a coupling capacitor 148 to the terminal 63 and thus via cable 21 to the antenna terminal 22 of the set 12.

As long as the button 25 is open, the oscillator 141 is inactive and the television program signals from the remote tuner 17 simply proceed via the tuner output cable 21 to the terminal 63 and thence to the antenna terminals 22 of the set and local tuner 16 adjusted to the channel onto which the remote tuner 17 transposes the received television program signals.

Upon depression of the viewer reaction button 25, the oscillator 141 is turned on via lead 51 and applies to the terminal 63, cable 21, antenna terminal 22 and local tuner 16, a signal that will modify the display of the particular television program by the set 12. For instance, the oscillator 141 may be designed to generate a signal which will obliterate or blank the display on the screen 19. By way of example, the oscillator 141 may be designed to generate a sine wave of sufficient intensity to affect the operation of the automatic gain control (AGC) of the television set 12 so that signals applied via the remote tuner 17 are blanked out as long as the button 25 is depressed.

In some instances, it is advantageous to interrupt the operation of the remote tuner 17 upon depression of the viewer reaction push button 25. For instance, and as shown in FIGS. 2 and 3, the power supply of the tuner 17 may proceed from a supply lead 151 via a switching transistor 152, lead 153, power input terminal 154 and power lead 155 to the remote tuner 17. As long as the viewer reaction switch 25 is open and the equipment is ure to select that channel may be considered as a viewer reaction. Depending on the type of evaluation desired, a distinction may, however, have to be drawn between the type of viewer reactions that are registered through the buttons 25 to 28, on the one hand, and channel selection, on the other hand.

Figure 4:
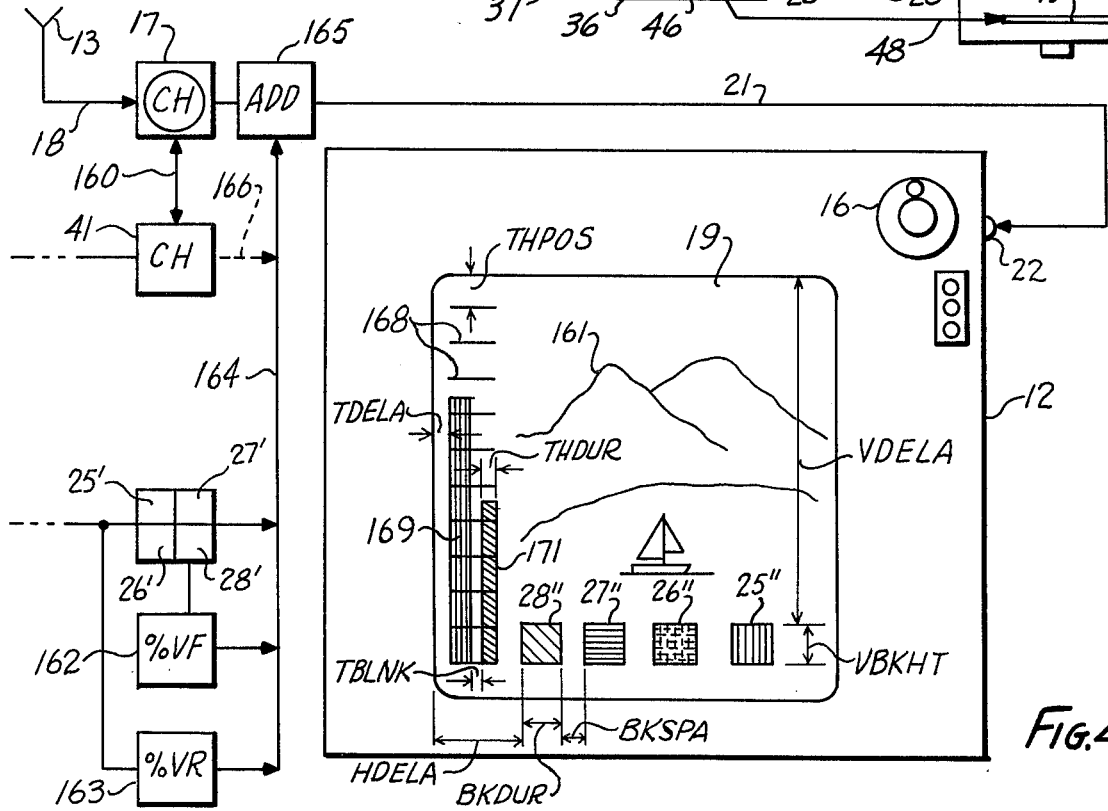
FIG. 4 is a block diagram and an elevation of a system for determining the reaction of television viewers in accordance with a preferred embodiment of the subject invention.

As shown in FIG. 4, there may be provided a display 161 of a broadcast video program. There may further be a determination of a relative number of sets responding to that broadcast video program, as indicated by the box 163. There may then be provided in the display 161 a pictorial representation of the determined relative number of responding sets.

In accordance with a preferred embodiment of the subject invention, a visual graduation system, such as a scale 168 may be displayed on the screen 19 in part of the display 161. A pictorial representation 169 of the relative number of responding sets or viewers may then be displayed within the visible graduation system 168 such as in the form of a band the height of which is adjusted relative to the scale in terms of the mentioned number of responding sets or viewers.

Similarly, and with reference to the block 162, a pictorial representation 171 of an extreme viewer reaction may be displayed in the graduation system 168, such as in the form of a band the height of which is adjusted relative to the scales 168 in terms of magnitude of received extreme viewer reactions.

By way of example, the extreme viewer reaction may be applause as registered, for instance, via buttons 28 at various sets, or an extremely unfavorable viewer reaction, such as would be registered through actuation of zap buttons 25 described above.

In this respect, each potentially participating set is equipped with a manually actuable device 24 for registering any of four different types of viewer reactions to the broadcast video program. In practice, these reactions may range from very unfavorable through indifferent to very favorable. Similarly, the display 161 or monitor shown in FIG. 4 is provided with a facility for displaying a number of pictorial representations 25", 26", 27" and 28" corresponding to the four different types of viewer reactions for individually indicating each viewer reaction type. These viewer reactions are received from the manually actuable device 24 via lines 37, 37', 37", etc., interrogator 26 and outputs 25' to 28' and are individually displayed according to reaction type through the corresponding pictorial representation 25", 26", 27" or 28" in the display 161.

This individual display of the particular types of viewer reactions makes the system very valuable as an accurate and relevant evaluation tool which distinguishes itself favorably from prior-art approaches that have attempted to rely on averaging or lumping different types of viewer reactions into a common indication.

In accordance with a further preferred embodiment of the subject invention, at least one of the pictorial representations 25" to 28" may be varied as a function of a viewer response magnitude.

For instance, achievement of a predetermined viewer response magnitude may be sensed for at least one reaction type and the pictorial representation corresponding to the latter reaction type may be flashed in the display 161 in response to achievement of the predetermined viewer response magnitude.

A particularly meaningful system is realized if any one of the visual indications 25", 26", 27" and 28" is made to blink or otherwise vary in appearance in response to the corresponding viewer reaction represented by buttons 25, 26, 27 and 28, respectively, exceeding a certain treshold percentage or other predetermined magnitude.

The displays and pictorial representations according to the illustrated preferred embodiments are more instantaneously perceived and are easier to comprehend and evaluate by viewer reaction surveillance people than numerical or other prior-art indications. In particular, these pictorial representations of various viewer reactions are presented and perceived not only in context with the exact phase of the video transmission to which the particular reactions pertain, but also in the context of such meaningful parameters as the percentage of viewers responding or actually participating at the particular instant. Moreover, as shown, for instance, by the block 28" and by the band 171, the same type of viewer reaction may be presented in a qualitative manner for facile comprehension by the surveillor and quantitatively in terms of a graduation system for more thorough analysis as needed.

In this respect, any one of the indications 25" to 28" may alternatively be quantitatively indicated through the variable-height band 171.

In practice, and as shown in FIG. 5, the interrogator 36 may for each viewer reaction line or polling channel 37, 37' and 37" have equipment 175, 175' and 175", respectively, for detecting or demodulating, multiplexing and identifying registered viewer responses and set determinations in terms of participating viewers or sets.

An example of a composition of the blocks 175 to 175" is shown in FIG. 5 for the block 175. In particular, the viewer response or polling line 37 is connected to an FM detector 176 which is a counterpart of the modulator 127 shown in FIG. 3 and which accordingly detects or demodulates the transmitted viewer reaction and set condition signals.

The detected signals are demultiplexed by a demultiplexer 178 which is a counterpart of the multiplexer 76 shown in FIG. 3 and which is switched by a timing signal generator 179, being a counterpart of the timing unit 100 shown in FIG. 3.

A digital signal level detector 180 applies the demodulated viewer response and set condition signals to the demultiplexer 178 for rearrangement and application to output buffers 181.

An input signal indicator or detector 182 derives from the preamplifier and detector 176 an indication that a viewer reaction or set condition signal has arrived and applies this information to output buffer 181.

According to FIG. 5, the function of the selective interrogator dial 46 is performed by set or viewer identification codes 183 and unit and byte select detectors 184 cooperating with the output buffer 181. The viewer identification codes 183 for the various blocks 175, 175', 175", etc., may be provided by a computer facility 185 or by appropriate hardwiring (cf. hardwiring 215 in FIG. 6).

By way of example, and not by way of limitation, examples will now be given of suitable components for use in the blocks 175, 175' et seq.

For instance, the preamplifier and FM detector assembly 176 may include a dual operational amplifier type XR-4558, made by EXAR INTEGRATED SYSTEMS, INC., and described, for instance, in their bulletin entitled "XR-4558 Dual Operational Amplifier" and dated October 1975. For FM detection, one of these dual operational amplifiers may drive a phase locked in operation, the power transistor 152 is closed and supplies the tuner 17 with operating power. Upon depression of the viewer reaction button 25, the base electrode of an NPN control transistor 157 is pulled toward ground whereby the control transistor 157 is caused to open the power transistor 152.

This, in turn, interrupts the power supply to, and thus the operation of, the remote tuner 17, whereby television broadcast signals are disabled from reaching the antenna terminals 22 of the set via the cable 21. Accordingly, display of the television program to which the viewer reacted by depressing the button 25 is rendered impossible for the moment.

The buttons 25 to 28 may represent different degrees or kinds of viewer reaction. For instance, the button 28 may be labeled for registration of a very favorable viewer reaction. The button 27 may then be labeled for a moderately favorable viewer reaction. By contrast, the button 26 may be labeled for registering a moderately unfavorable viewer reaction.

In practice, the button 25 is preferably reserved for the most unfavorable viewer reaction. In particular, the blanking of the television program associated with the button 25 provides an appeal to a certain curious human desire to have everything go ZAP if one is very dissatisfied. By providing this ZAP facility, the value of the system is greatly enhanced in terms of reliability, since that facility provides the viewer with an incentive to register his reactions. At the same time, the ZAP facility provides a safeguard against overreaction or careless manipulation, since a viewer would, of course, not want to blank out a picture with which he is satisfied or only moderately dissatisfied.

In accordance with a preferred embodiment of the subject invention shown in FIG. 4, pictorial presentations of viewer reactions and set conditions are displayed in a display of the video program to which the viewers are reacting at the time.

In particular, the particular video program 161 may be displayed on the screen 19 of a monitor or television set 12. Referring to FIGS. 1 and 4, the antenna 13, leads 18, tuner 17, table 21 and antenna terminals 22 may be employed to apply an off the air broadcast composite video signal to the set 12 in FIG. 4 in order to provide a display 161 of the video program to which the viewer reactions registered through the facility 24 at the various participating sets apply.

In practice, the off the air nature of the display 161 employed in the monitoring or surveillance of the viewer reactions can be an important feature. In particular, since the viewers react to the performance which they see on the screens of their sets, it is relevant and valuable for surveillors and evaluators to see the various viewer reactions in the context of the same display as is or was apparent to the viewers. For instance, the viewers at various instances may be reacting to matters that may not be apparent to a studio monitor, such as transmission deficiencies or peculiarities or messages or other matters superimposed by the network.

The same applies, of course, in the case of cable television, where viewers may, for instance, be reacting to a system-wide loss of synchronization or degradation in quality or to superimposed messages or news items. Accordingly, the feature according to which the monitor displays an off the air composite video signal should be interpreted broadly enough to cover also display of composite video signals received through a cable television system, such as has been indicated at 14 in FIG. 1.

Referring further to FIGS. 1 and 4, it may be recalled from the above mentioned description of FIG. 1 that the interrogator 36 may output each channel determination as indicated by a block 41. As further indicated in FIG. 4 by a double arrow 160, the operator of the monitor shown in FIG. 4 would correlate the channel determination effected by the interrogator 36 and the setting of the tuner 17 to make sure that the compiled viewer reactions are displayed in the exact video program with respect to which they have been generated. This is particularly important in multichannel broadcast systems where care has to be taken that the viewer reaction display is not associated with a display of a television program from the wrong channel. Of course, the tuning to the various channels may, if desired, be performed by the set's own tuner 16 as long as the adjustment of that tuner is properly correlated to the channel to which the particular viewer reactions apply.

Referring further to FIGS. 1 and 4, it will be recalled from the above description of FIG. 1 that the interrogator 36 may also output each received viewer reaction 25' to 28' corresponding to the push buttons 25 to 28. In practice, and with reference to FIG. 4, registered viewer reactions pertaining to the same push button 25, 26, 27 or 28 may be cumulated prior to application to the monitor set. However, it is not the preferred practice of the subject invention that viewer reactions be cumulated or averaged among the buttons 25 to 28.

If desired, a determination may be made, such as on the basis of the output 28', how many of the viewers are registering the type of reaction corresponding to the push button 28. For instance, if actuation of the push button 28 represents applause or a similar type of favorable reaction, then an indication may be derived from the interrogator output 28' as to the relative number of viewers responding favorably. This is indicated in FIG. 4 by the box 162 labeled %VF for "percent of viewers favorable".

In a similar vein, and as indicated by a box 163 in FIG. 4, a determination may be made of a relative number of sets responding to the particular broadcast video program. In FIG. 4, the box 163 has been labeled %VR for "percent of viewers responding". The latter designation should not be interpreted in a limiting sense. For instance, the relative number manifested by the box 163 may refer to the sample number of television receivers equipped with a response indicating facility, as contrasted to the entire number of sets in a given television broadcast receiving area or cable system.

On the other hand, the relative number signified by the box 163 may refer to the number of sets in a given sample which are tuned at a given time to a particular channel under surveillance, as contrasted to the total number of sets of that sample.

By way of further example, the box 163 in FIG. 4 may signify the number of manually actuable devices 24 which are receiving viewer reactions at a given time, as contrasted to the total number of manually actuable devices then available for viewer reaction registration.

The data issued at 25' to 28', 162 and 163 is applied via leads 164 to a facility 165 which adds such data or corresponding signals to the composite video signal for display by the monitor set 12. A dotted line 166 in FIG. 4 indicates a possibility of generating and applying a signal which indicates the relative number of television sets which in a given sample are tuned to a particular channel at a particular time. In the context of the subject invention, selection of a particular channel or failloop, while the other may serve as a buffer at a loop output. The loop itself may, for instance, comprise a COS/MOS Micropower Phase-Locked Loop Type CD 4046A described, for instance, on pages 465 to 469 of the above mentioned RCA Integrated Circuits Data Book.

The demultiplexer 178 may include 8-Bit Addressable Latches Type F4724 described, for instance, in the above mentioned MOS/CCD Data Book of 1975 by Fairchild Semi-Conductor Company.

The address inputs of the demultiplexer 178 may be serviced by a binary counter of the above mentioned type F4520 which, in turn, is clocked by a series connected differentiator, receiving its input from the output buffer of the FM detector 176, full-wave rectifier, and threshold detector, each of which may include an operational amplifier of the above mentioned type XR-4212. The timing signal generator 179 may further include retriggerable, resettable monostable multivibrators for resetting its above mentioned counter F4520 and for energizing the active low enable input of the demultiplexer 178, type F4724. These retriggerable, resettable monostable multivibrators may, for instance, be of the type F4528, described on page 4–176 of the above mentioned Fairchild Semiconductor MOS/CCD Data Book. The timing signal generator 179 thus determines when signal transistions occur and drives the demultiplexer 178 accordingly.

The digital signal level detector 180 may comprise a threshold detector including, for instance, an operational amplifier of the above mentioned type XR-4212. In particular, the digital signal level detector 180 derives demodulated digital data from the FM detector 176 and applies such derived data to the data input of the demultiplexer 178.

The input signal indicator 182 may include any conventional circuit which detects the presence of a carrier in the signal received by the FM detector 176. In practice, the presence of that carrier indicates that a signal is being received at the time.

The latch outputs of the demultiplexer 178 and the output of the signal indicator 182 are applied to inputs of buffers 181 which, for instance, may be Tri-State Hex Buffers of the type DM74LS367 shown and described, for example, on pages 1–32 to 187 of the National Semiconductor TTL DATA BOOK (1976).

The unit and byte select detector 184 may, for instance, include a 6-Bit Unified Bus Comparator type DM8131 as shown and described, for instance, on pages 3–19 and 3–20 of the above mentioned National Semiconductor TTL DATA BOOK. The output of the unit and byte select detector 184 may be applied to the G1 input of the above mentioned Hex Buffers DM74LS367 in the output buffers 181.

The computer facility 185 may be a conventional computer subsystem having an input bus control 186, input line data store 187, data processor 188, television channel response store 189 and output bus control 190.

Lines 187' from the output buffers 181 in the blocks 175, 175', and 175", etc. individually apply the line data from the blocks 175, 175' and 175" to the input bus control 186 of the computer subsystem 185.

These line data typically include channel selection information (see block 41 in FIG. 1), viewer response information (see blocks 25' to 28' in FIG. 1) and viewer identification codes (see block 185 in FIG. 5). Lines 188', on the other hand, proceed from the input bus control 186 to the blocks 175, 175', 175", etc., for line or unit and byte selection.

Line data received via lines 187' and bus control 186 are stored in the input line data store 187. In this respect, the line data store 187 may be compared to the blocks 25' to 28' in FIG. 1.

The television channel response store 189 may be compared to the block 41 in FIG. 1 and, being connected to the data processor 188, stores information identifying for each registered viewer response the television channel or program to which it applies.

Stored data are output by the bus control 186 via lines 191, 192 and 193. In particular, the line 191 carries computer data or CDAT signals, the line 192 carries computer address or CADD signals, while the line 193 carries a strobe signal.

By way of example, a number of most significant address bits in the line 192 may represent the particular television channel number in binary notation. Lesser or least significant address bits in line 192 may represent different types of viewer responses as received, respectively, through push buttons 25 to 28 in the manually actuable device 24 shown in FIG. 1 and as represented by the blocks 25" to 28" in the display 161 of FIG. 4.

Such address bits may also represent numbers of the "thermometer bars" 169 and 171 shown in FIG. 4.

In this respect, the data signals in the line 191 may have different meanings depending on whether they pertain to any of the block displays 25" to 28" or to the bar displays 169 and 171. For instance, data in the line 191 may represent viewer response or participating set percentages of the type discussed above in connection with blocks 162 and 163 in FIG. 4.

As to the display blocks 25" to 28" in FIG. 4, data signals in the line 191 may indicate whether the particular block is to be displayed at a given instant and/or is to be flashed or blinked when a predetermined viewer response magnitude pertaining to the particular display block is prevailing.

The data strobe in line 193 may be a pulse indicating that the signals in lines 191 and 192 are meaningful. In practice, the line 191 and 192 may, of course, have as many wires as are needed for the transmission of address information and data signals from the output bus control 185 to an interface buffer 195.

The interface buffer 195 shown in FIG. 5 serves as a termination of the signal lines 191 to 193 from the computer facility 185. By way of example, as many TTL Schmitt triggers as there are signal wires from the bus control 186 may be used in the interface buffer 195 for noise immunity.

As further shown in FIG. 5, the resulting address signals (ADDR), data signals (DATA) and data strobe (DSTB) are applied by the interface buffer 195 to the bar data input latches 197 which, in response to a bar request signal (BREQ) issue control signal for a block and bar generator 198 via a bar signal bus (BRBS).

As its name implies, the block and bar generator 198 generates the requisite signals for realizing the block displays 25" to 28" and the bar displays 169 and 171 in the video display 161 as shown in FIG. 4. A video processor 200 provides the block and bar generator 198 with horizontal drive (HDR) and vertical sync (VERT) signals, and the block and bar generators 198, in turn, provides the video processor 200 with bar or block number signals (BKNR) and bar enable signals (BAREN). The video processor 200 adds this information to the composite off the air video signal and, in this sense, may be considered included in the block 165 shown in FIG. 4.

In particular, the video processor 200 receives the off the air television signal via antenna 13 or equivalent cable 14, tuner 17 and a first part of the cable 21 and adds the information received from the block and bar generator 198 to such off the air video signal. A channel encoder of the type of encoder 23 shown in FIG. 2 may be employed in the equipment of FIG. 5 in order to make sure that viewer responses and similar data are only displayed with the television program to which they pertain.

To this end, the channel encoder 23 may be ganged to the tuner 17 as indicated by the phantom line 66. The outputs 71 to 74 of the channel encoder 23 may be applied to the bar data input latches 197 as shown in FIG. 5.

The resulting composite video signal with block and bar information is applied to the set 12 shown in FIGS. 4 and 5 for display on the screen 19. To this end, a monitor may be used which has its tuner output and video amplifier input separated so that the composite video signal can be patched in. If desired or necessary, the signal may be applied via the antenna terminals of the set.

In accordance with the illustrated preferred embodiment a video tape recorder or other video recorder device 202 may be employed in conjunction with the video processor 200 and video display monitor 12.

In particular, the video tape recorder 202 is connected via terminal 201 to the video processor 200 in order to record the combined television program signals and viewer reaction and response information for subsequent playback and display by the set 12 shown in FIG. 5 or by an other monitor or video display set. In other words, the recorder 202 in effect records the display 161 of the broadcast video program together with the pictorial representations 25'' to 28'' and 169 and 171 and graduation system 168 for subsequent display to persons who wish to review, assess or evaluate the particular television performance or the efficacy of their message.

In accordance with a preferred embodiment of the subject invention, all or any part of the viewer response information shown in FIG. 4, or any other like or similar information may be displayed to one or more of the participating viewers at their own sets. In practice, this has the great advantage of giving the viewers an increased sense of participation and of thus augmenting their willingness to participate and their dedication to respond and make their vote count.

With state of the art equipment, such features have been heretofore unthinkable. However, the subject invention places a display of viewer responses to the responding viewers well within the realm of feasibility. For instance, the combined video and viewer response signals issued by the video processor 200 at the output 21 could be cabled or otherwise transmitted to participating viewers via the cable 14 partially shown in FIG. 1 or then via antennas 13. Of course, once the principle of the system has been conceived and implemented according to the subject invention, many ways are apparent to those skilled in the art for transmitting viewer reaction information along with television programs to the participating viewers.

In a similar vein, the sense of participation and the dedication of responding viewers may be augmented by showing one or more viewer groups from time to time how they performed in their response during recent television broadcasts.

This can be very conveniently accomplished by employing the video tape recorder 202 as shown and described in connection with FIG. 5 to record television programs and associated viewer reactions and to employ the recordings thus made for subsequent playback to participating viewer groups. This procedure and approach are to be carefully distinguished from the above mentioned prior-art procedures which require that the viewers be assembled in the same room or auditorium during the generation of the response. In that case, the presence of a large number of viewers in the same room practically inevitably influences and often falsifies their response as compared to the responses that would have been more realistically obtained from these viewers if they had been separate from each other in their various homes when registering their reactions.

Figure 6:
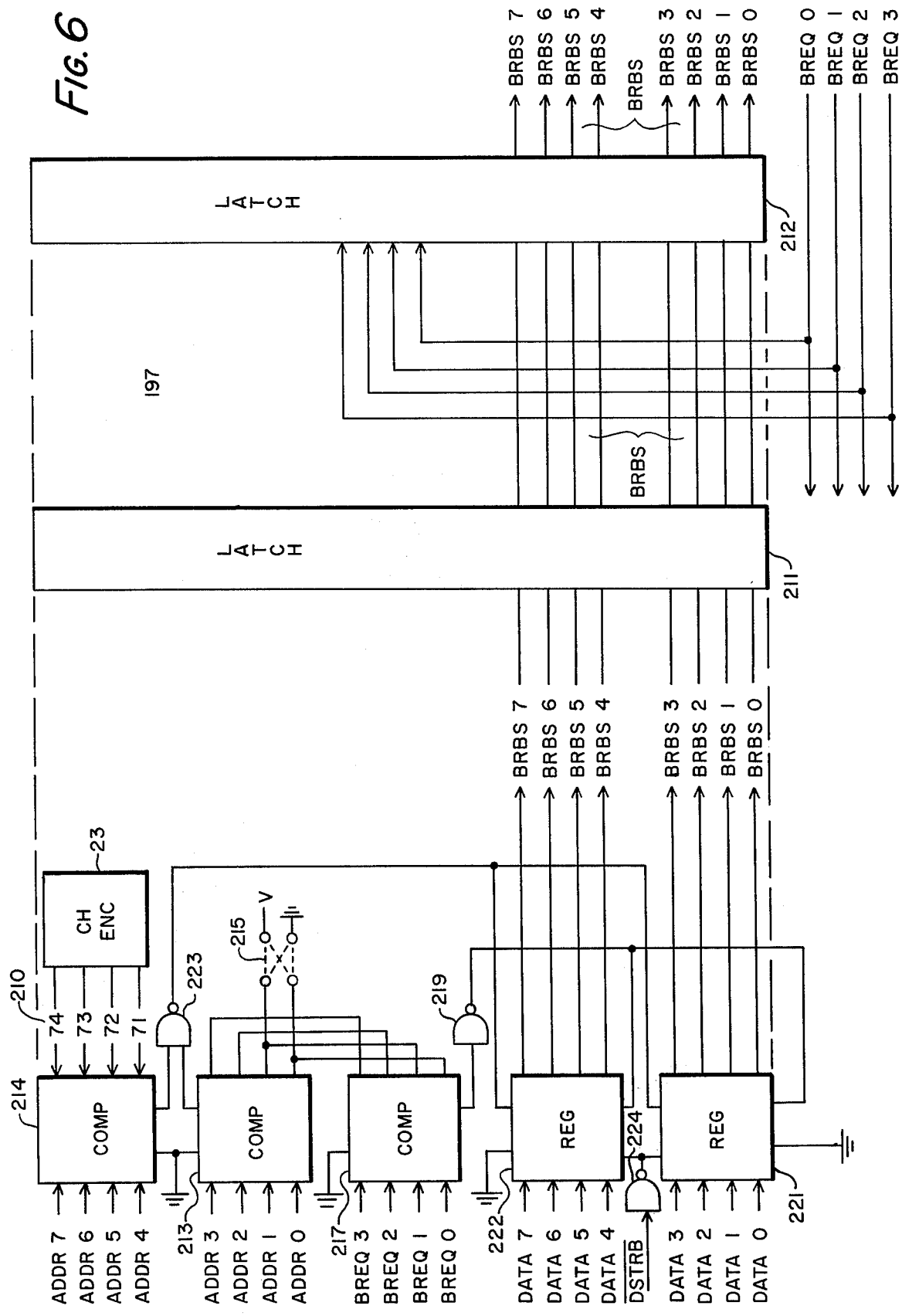
FIGS. 6, 7 and 8, to be positioned with their small sides side-by-side, present a combined circuit and block diagram of a system for determining the reaction of television viewers in accordance with a further preferred embodiment of the subject invention.
Figure 7:
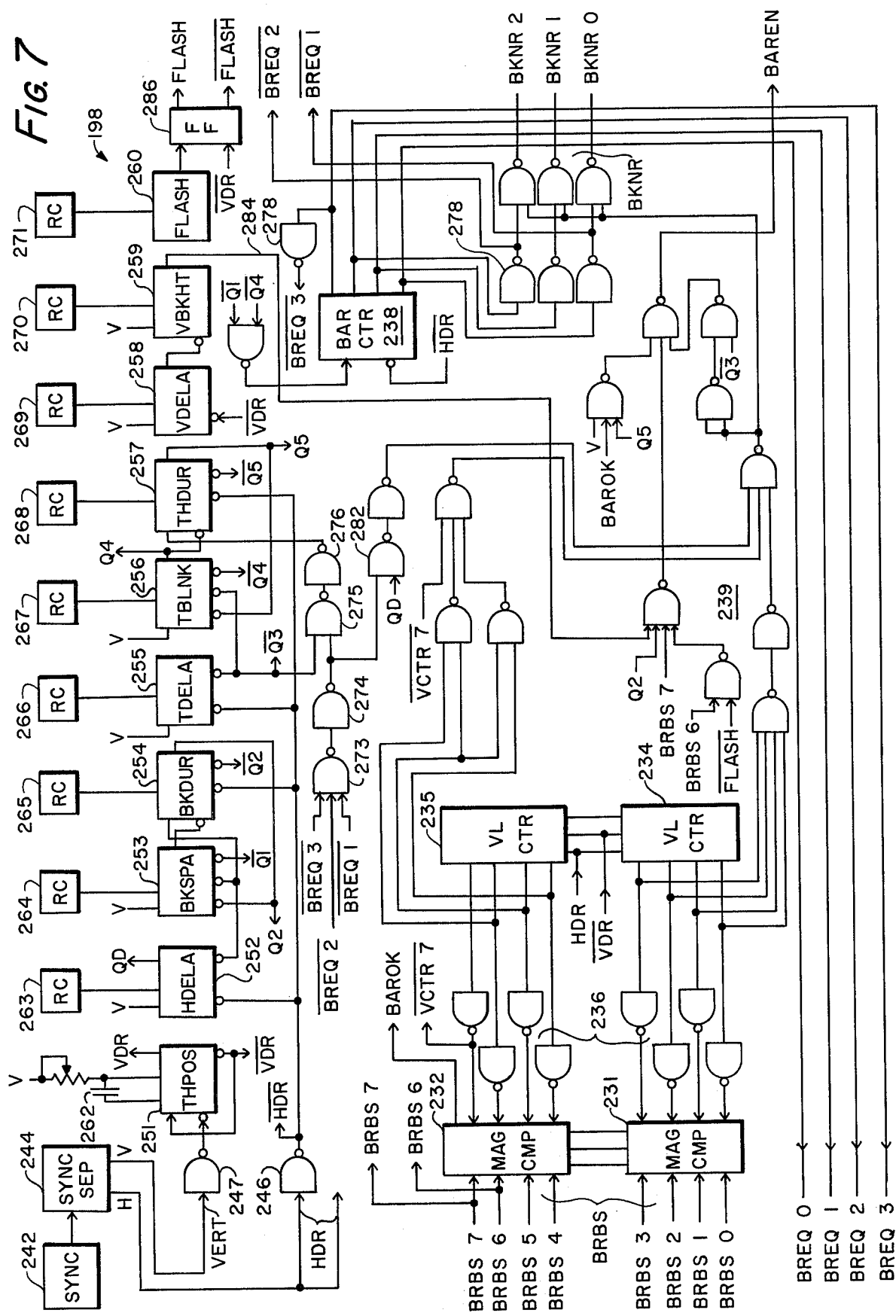
Figure 8:
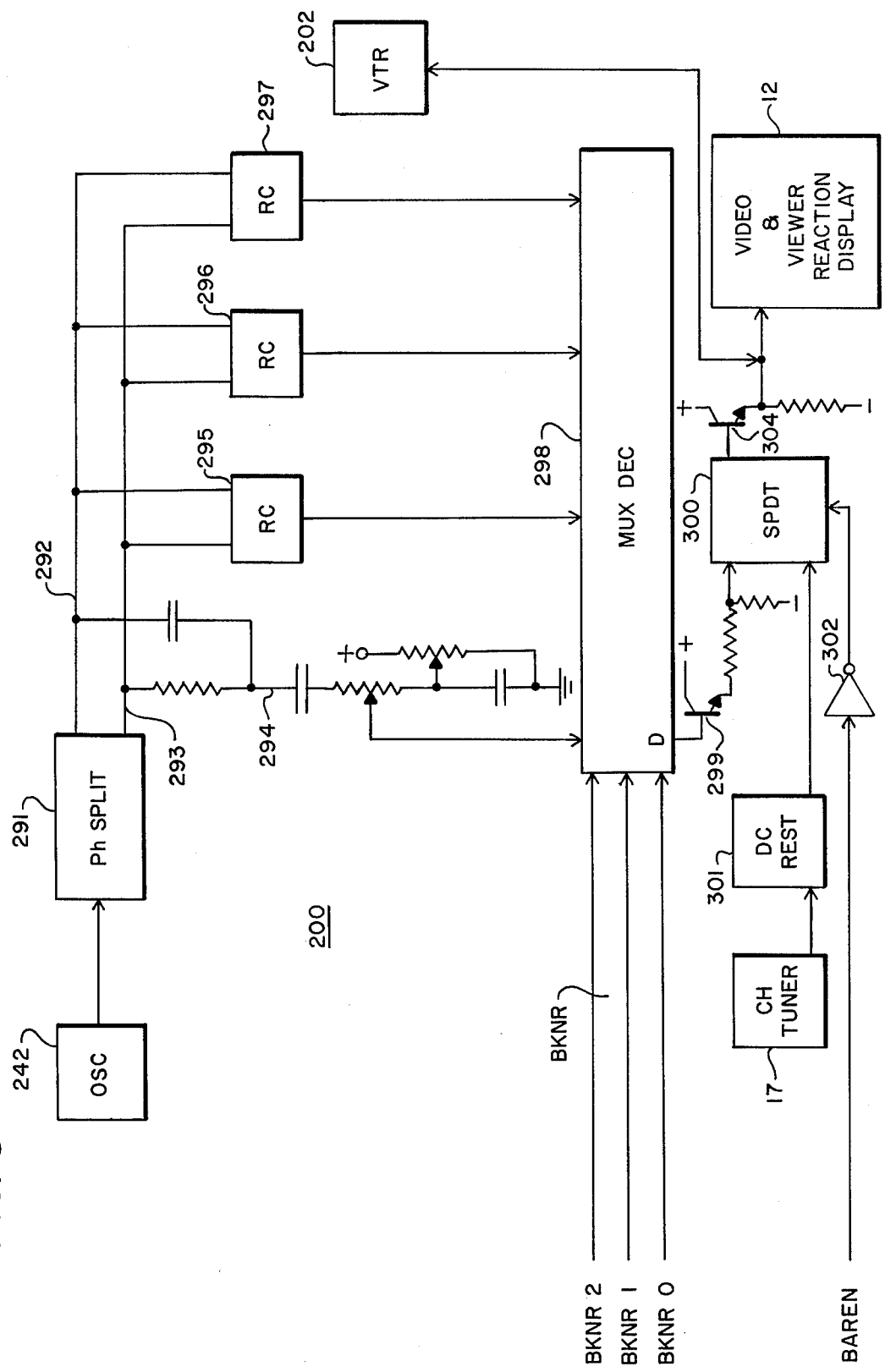

A preferred embodiment of the combination shown in the lower part of FIG. 5, including the bar data input latches 197, block and bar generator 198 and video processor 200 is illustrated in FIGS. 6, 7 and 8, respectively.

In particular, the bar data input facility 197 shown in FIGS. 5 and 6 includes as many latches as are required in a given case to display the desired number of pictorial blocks 25'' to 28'' and bars 169 to 171. FIG. 6 shows three latches 210, 211 and 212. Of these, the latch 210 is shown in greater detail, with the understanding that the remaining latches may include identical or similar components.

Preferably, components having a tri-state output are employed to the extent necessary to permit the latches to be wired together on a common bus BRBS.

As shown by way of example for the latch 210 in FIG. 6, the latches of the bar data input facility 197 include binary comparators 213 and 214 for matching address bits ADDR 0 to ADDR 7 against bar number bits hardwired at 215 and against the four television channel bits 71 to 74 from the channel encoder 23 signifying the channel to which the particular set being interrogated is tuned at the particular time. As shown by dotted lines at 215 in FIG. 6, the bar number hardwiring has a choice of four combinations among a voltage V and ground. Unless otherwise indicated or apparent, V stands for a collector supply voltage $V_{cc}$.

Each latch further has a comparator 217 which matches bar request signals BREQ 0 to BREQ 3 to hardwired bar number bits.

By way of example, the comparators 213, 214 and 217 may be unified bus comparators of the type DM7160 shown, for instance, in the above mentioned National Semiconductor TTL DATA BOOK (1976) pages 3-19 et seq.

The output of the comparator 217 is applied via a NAND element 219 to the output control of two registers 221 and 222. The output of the comparators 213 and 214 is connected via a NAND element 223 to the data enable inputs of the registers 221 and 222.

An inverse of the data strobe pulse ($\overline{\text{DSTRB}}$) is applied via a NAND element 224 to the clock inputs of the registers 221 and 22.

Accordingly, when a match is sensed by the comparators, the latch inputs are enabled, allowing the strobe to clock in the data bits DATA 0 to DATA 7. In practice, not all the data and address bits shown in FIG. 6 may be needed for displaying the pictorial blocks and bars shown in FIG. 4. However, more blocks and bars than as shown in FIG. 4 can be displayed depending on the desired number of surveyable viewer reactions, set conditions and other parameters.

By way of example, the registers 221 and 222 in the latches 210 etc. may be D-type registers of the type SN74173 shown at pages 360 et seq. in the TTL DATA BOOK for Design Engineers, First Edition (CC-411), by Texas Instruments, Incorporated. These registers have tri-state outputs, so that the outputs of all the latches can be wired together on a common bus BRBS, as indicated above and shown in FIG. 6.

Normally, the outputs of the registers 221 and 222 are in the high impedance state and will come on the bus only when given an output enable. The output enable for each latch, in turn, is generated by a match between four bar request bits BREQ 0 to BREQ 3 from the block and bar generator 198 shown in FIGS. 4 and 7, and the hardwired bar number 215 specific to a particular latch.

Accordingly, the block and bar generator 198 can issue a 4-bit bar request code BREQ, as more fully described below in connection with FIG. 7 and receive in turn an 8-bit data word from the latched-up data stored in the corresponding bar data register. These BRBS 0 to BRBS 7 data are applied from the bar data input latches 197 to the block and bar generator 198 via the common bar bus BRBS extending from FIG. 6 to FIG. 7 in the accompanying drawings.

In particular, the BRBS data are applied to magnitude comparators 231 and 232 in the block and bar generator 198 shown in FIG. 7. By way of example, these magnitude comparators may be of the type SN7485 shown, for instance, on pages 202 et seq. of the above mentioned Texas Instruments TTL DATA BOOK.

The block and bar generator 198 also includes vertical line counters 234 and 235 which are loaded during the vertical retrace interval with a predetermined binary equivalent such as the equivalent of 199, and which then are decremented one count each horizontal line. By way of example, the vertical line counters 234 and 235 may be of the type SN74161 as described, for instance, on pages 325 et seq. of the above mentioned Texas Instruments TTL DATA BOOK.

For the purpose of loading the vertical line counters 234 and 235, as mentioned above, the block and bar generator 198 generates a signal $\overline{VDR}$ as more fully described below. Similarly, a horizontal drive or HDR signal is generated for clocking the vertical line counters 234 and 235.

The data inputs of these line counters may be hardwired (not shown) among ground and $V_{cc}$.

The outputs of the vertical line counters 234 and 235 are applied via NAND elements 236 to inputs of the magnitude comparators 231 and 232 as shown in FIG. 7. Cascading inputs of the magnitude comparator 231 may be hardwired (not shown) among ground and $V_{cc}$. Cascading inputs of the magnitude comparator 232 are connected to corresponding outputs of the magnitude comparator 231. An output of the magnitude comparator 232 is connected to a line labeled BAROK for providing a signal which goes high when the instantaneous binary number standing on the BRBS bus is greater than the instantaneous binary number from the vertical line counters 234 and 235. It is by this technique that the height of the "thermometer" bars 169 and 171 in the display shown in FIG. 4 can be controlled by the computer facility 187. Requests to the input latches 197 shown in FIG. 6 to put their data on the BRBS bus are issued by a bar counter 238 in the form of the above mentioned BREQ signals proceeding via the bus facility labeled BREQ 0 to BREQ 3 and extending from FIG. 7 back to FIG. 6 to the comparator 217 in the latches 210 et seq.

The bar counter 283 is reset at the beginning of each horizontal line and incremented one count at the finish of each bar.

The assorted NAND gates 239 shown in the center and toward the right of FIG. 7 are connected to select combinations of several timed waveforms which result in a master switching signal BAREN for "bar enable", which indicates to the video processor 200 when to gate in a color signal instead of the normal off the air picture. When the BAREN signal is low, the normal television picture 161 is shown. When the BAREN signal is high, a color signal for depicting the blocks 25" to 28" and bars 169 and 171 is shown in the display 161. The illustrated system has a potential of sixteen different colors. However, according to FIGS. 7 and 8, only three bits of the block number bus BKNR are utilized with one of the block numbers being utilized for generating the calibration lines of the graduation system or scales 168, this leaves eight different colors for showing the blocks 25" to 28" and bars 169 and 171 via block number signals BKNR 0 to BKNR 2.

In practice, this potentially permits one or more of the pictorial representations shown in FIG. 4 to be equipped with a color change facility as a function of viewer response magnitude. Alternatively, more blocks or bars than the ones shown in FIG. 4 may be depicted for a wider range of viewer responses or a pictorial representation of further surveillance parameters.

The block and bar generator 198 and video processor 200 require synchronization signals and a color subcarrier signal, such as the 3.58 MHz color subcarrier in the NTSC system, for their operation. The requisite synchronization and color subcarrier signals may be derived from the composite video signal itself. Alternatively, these signals may be picked off from appropriate points in the circuitry of the monitor or video display set 12 on which the viewer reactions are to be displayed. Accordingly, FIG. 7 shows a synchronization signal source 242 and FIG. 8 shows a oscillator or color subcarrier frequency source 243, both of which may be of a conventional type.

According to FIG. 7, a sync separator 244 connected to the synchronization signal source 242 separates the synchronization signals into horizontal and vertical sync signals. The separated horizontal sync or HDR signals are applied to various components as shown in FIG. 7. One of these components is a NAND gate 246 which provides an $\overline{HDR}$ signal.

The separated vertical sync signal provides a signal VERT which, as shown in FIG. 7, is applied to a NAND element 247. The block and bar generator 198 further includes ten adjustable-duration timing devices 251 to 260. Of these, the devices 251 to 259 may comprise retriggerable monostable multivibrators with clear input.

Suitable types include the type SN75123 as shown, for instance, on pages 82 and 138 and 139 of the above mentioned Texas Instruments TTL DATA BOOK.

In FIG. 7, each timing device 251 to 260 has been assigned a five-letter mnemonic identifier which corresponds to the identically labeled distances shown in the display 161 of FIG. 4.

The first identifier assigned to the timing device 251 is THPOS for "thermometer position". The term "thermometer" actually refers to the calibration 168 which, together with the variable height bars 169 and 171 resembles a thermometer. Of course, this is a figurative designation, since parameters other than temperature are involved in the pictorial indications 169 and 171, as mentioned above.

A RC timing component combination 262 is associated with the multivibrator of the timing device 251 to permit adjustment of the calibration system 168 relative to the top of the picture 161. RC timing components 263 to 271 are associated with the elements 252 to 260, respectively, to provide individual adjustment of their time delays.

The vertical sync signal VERT is applied via the NAND element 247 to the low-level input of the multivibrator 251. The high-level input of the multivibrator 251 receives its own $\overline{Q}$ output in the form of a $\overline{VDR}$ output. The complementary Q output of the multivibrator 251 provides a VDR or vertical driver signal.

The next timing device 252 is labeled HDELA for horizontal delay. As shown in FIG. 4, the variable delay generated by this device determines the position of the blocks 25" to 28" in the display 161.

The low-level input of the multivibrator 252 is energized by the $\overline{HDR}$ signal. A voltage V for $V_{cc}$ is applied to the high-level input of the device 252. The Q output of the multivibrator 252 provides a QD signal. The $\overline{Q}$ output of the device 252 is applied to the high-level input of the multivibrator 254.

The timing device 253 is labeled BKSPA for "block spacing", since the element 253 permits variable adjustment of the spaces between the blocks 25" to 28". The low-level input of the multivibrator 253 receives the Q output of the block duration or BKDUR device 254 in the form of a Q2 signal. The high-level input of the multivibrator 253 again receives a voltage V, as is also the case with the multivibrators 255, 256, 258 and 259. The clear input of the multivibrator 253 is connected to the $\overline{Q}$ output of the multivibrator 252. The $\overline{Q}$ output of the multivibrator 253 provides a $\overline{Q1}$ signal.

The Q output of the multivibrator 253 energizes the low-level input of the multivibrator 254 which determines the duration or width of the blocks 25" to 28" shown in FIG. 4.

The above mentioned $\overline{HDR}$ signal is applied to the clear input of the multivibrator 254 which, at its $\overline{Q}$ output provides a $\overline{Q2}$ signal.

The multivibrator 225 is labeled TDELA for "thermometer delay". As shown in FIG. 4, the multivibrator 255 determined the horizontal position of the calibration system 168. The $\overline{Q}$ output of the multivibrator 255 provides a $\overline{Q3}$ signal which is also applied to the clear input of the multivibrator 256.

The multivibrator 256 is labeled TBLNK for "thermometer blank". As indicated in FIG. 4, the adjustable device 256 determines the spacing between the bars 169 and 171. The low-level input of the multivibrator 256 receives a Q5 signal from the Q output of the multivibrator 256. The $\overline{Q}$ output of the multivibrator 256 provides a $\overline{Q4}$ signal. The Q output of the multivibrator 256, on the other hand, provides a Q4 signal which is also applied to the low-level input of the multivibrator 257.

The multivibrator 256 is labeled THDUR for "thermometer duration". As indicated in FIG. 4, the multivibrator 257 indicates the width or duration of the thermometer bar or column. The above mentioned $\overline{HDR}$ signal is applied to the clear input of the multivibrator 257 which at its Q output provides the above mentioned Q5 signal and its $\overline{Q}$ output a complementary $\overline{Q5}$ signal.

To this end, the high level input of the multivibrator 257 receives a signal derived from a chain of NAND elements 273 to 276. The NAND element 273 receives inverted bar request or $\overline{BREQ\,1}$, $\overline{BREQ\,2}$ and $\overline{BREQ\,3}$ signals from inverters 278 connected to the outputs of the bar counter 283. In this connection, the bar counter 283 may be of the same type as the vertical line counters 234 and 253. A clear input of the bar counter 283 receives the above mentioned $\overline{HDR}$ signal. A clock input of the bar counter 283 is energized from the output of a NAND element 281 which receives at its inputs the above mentioned $\overline{Q1}$ and $\overline{Q4}$ signals generated by the multivibrators 253 and 256. The output of the NAND element 273 is connected to the input of the NAND element 274. The output of the NAND element 274, in turn, is connected to inputs of NAND elements 275 and 282. Another input of the NAND element 275 receives the above mentioned $\overline{Q3}$ signal generated by the multivibrator 255. Another input of the NAND element 282 receives the QD signal generated by the multivibrator 252. The NAND element 282 is part of the NAND gate assortment 238, the function of which, as mentioned above, results in the bar enable or BAREN signal.

The output of the NAND element 275 is applied to the input of the NAND element 276. The output of the NAND element 276 is, in turn, applied to the high-level input of the multivibrator 257.

The adjustable timing device 258 is labeled VDELA for "vertical delay". As indicated in FIG. 4, the multivibrator 258 determines the vertical position of the pictorial display blocks 25" to 28". The low-level input of the multivibrator 258 receives the $\overline{VDR}$ signal provided by the $\overline{Q}$ output of the multivibrator 251. The Q output of the multivibrator 258 is applied to the low-level input of the multivibrator 258. This multivibrator 258 is labeled VBKHT since its Q output signal applied to a line 284 determines the vertical block height as indicated in FIG. 4.

Selective flashing or blinking of the blocks 25" to 28" is controlled by a timer 260 which, by way of example may be of the Signetics Type 555 as described, for instance, in the SIGNETICS DIGITAL LINEAR MOS catalogue, pages 6–49 to 655. The RC network 271 is compatible with the timer 260. The output signal of the timer 260 is applied to the D input of a D type flip-flop element 286 which is clocked by the $\overline{VDR}$ output signal of the multivibrator 251. The Q output of the element 286 provides a FLASH signal, while the $\overline{Q}$ of the element 286 provides a $\overline{FLASH}$ control signal.

The timer 260 and flip-flop element 286 effect flashing or blinking of any of the blocks 25" to 28" under the control of particular viewer response magnitudes as determined by the computer facility 187. Further uses of some of the above mentioned signals provided by the devices 151 to 260 are illustrated in FIG. 7 by means of arrows and appropriate signal designations.

The video processor 200 shown in FIGS. 5 and 8 contains mostly analog circuitry. As indicated in FIG. 5, the HDR and VERT signals may be provided in the video processor 200 or may even be derived from the monitor set 12 itself, as mentioned above. Alternatively, a source of these sync signals has been shown at 242 in the block diagram of FIG. 7.

The color subcarrier signal derived from the above mentioned source 243 is amplified and filtered to obtain a sine wave which is applied to a phase splitter 291.

The phase splitter 291, in turn, provides on lines 292 and 293 two sine waves 180° out of phase. The lines 292 and 293 act as parallel busses for a number of adjustable series RC combinations 294, 295, 296 and 297. The RC combinations 295 to 297 may be identical to the illustrated RC combination 294. The actual number of RC combinations is determined by the number of colors desired for the viewer response display.

By adjustment of the RC combination 294 to 297, color subcarrier frequency sine waves having any desired phase between 0° and 360° may be obtained for application to a multiplex switch 298. By way of example, the switch 298 may be a multiplex switch with decode of the type DG501 described, for instance, in the Siliconix Integrated Circuits Data Book pages 1-99 to 1-102. The RC combinations 294 to 297 may be provided with separate luminance and chrominance adjustment as shown for the RC combination 294.

The multiplex switch 298 is controlled by the block number signals BKNR 0, BKNR 1 and BKNR 2 via the block number or BKNR bus extending from FIG. 7 to FIG. 8 for the selection of a particular instantaneous color.

The D output of the multiplex switch 298 is applied via a transistor 299 to an input of an electronic single-pole double-throw switch 300 which, for instance, may be a type DG187 one channel high-speed driver with SPDT junction FET switch as shown and described, for instance, on pages 1-77 to 179 of the above mentioned Siliconix Integrated Circuits Data Book.

The other input of the switch 300 is a direct-current restored version of the off the air or cable composite video signal. To this end, the channel tuner 17 has its output connected via a direct-current restorer 301 to a second input of the switch 300.

The bar enable or BAREN signal generated by the circuitry shown in FIG. 7 is applied via an inverter 302 to the switching control input of the switch 300. In this manner, the switch 300 applies to the video monitor or color television display set 12 via a transistor stage 304 either the received color television program video signal or the color signals representing viewer reactions and similar parameters for display as shown in FIG. 4. As shown in FIG. 8, the output of the switch 300 may also be applied to a video tape recorder or similar recording facility 202 for simultaneous recording of the viewer reaction representations in the context of the particular video program.

In connection with the embodiment shown in FIGS. 6 to 8, the use and display of color video information has been emphasized. Of course, the subject invention and its preferred embodiments are also suitable for black and white display. A color display is, however, considered more effective for surveillance purposes.

It will be recognized that the subject invention and its preferred embodiments meet all of the initially mentioned objectives.

The subject disclosure renders apparent or suggests various modifications and variations within the spirit and scope of the subject invention to those skilled in the art.

I claim:

1. In a method of determining the reaction of television viewers to a video program displayed by different video display sets in a broadcast reception area, the improvements comprising in combination the steps of:
broadcasting said video program to said sets for display at the discretion of television viewers in said area;
providing a display of said broadcast video program;
determining a relative number of said sets responding to said broadcast video program; and
providing in said display a pictorial representation of said relative number of responding sets.

2. A method as claimed in claim 1, including the step of:
recording said display of said broadcast video program together with said pictorial representation for subsequent evaluation.

3. A method as claimed in claim 2, including the step of:
playing back and displaying said display of said broadcast video program together with said pictorial representation.

4. A method as claimed in claim 1, including the steps of:
providing potentially participating sets with a facility for registering a viewer reaction to said broadcast video program; and
providing in said display a pictorial representation of registered viewer reactions.

5. A method as claimed in claim 1, including the steps of:
providing potentially participating sets with a facility for registering any of a predetermined number of different types of viewer reactions to said broadcast video program;
providing said display with a facility for displaying a number of pictorial representations corresponding to said predetermined number of different types of viewer reactions for individually indicating each viewer reaction type;
receiving said types of viewer reactions through said registering facility; and
displaying in said display received viewer reactions according to reaction type through the corresponding pictorial representations.

6. A method as claimed in claim 5, including the step of:
varying at least one of said pictorial representations as a function of a viewer response magnitude.

7. A method as claimed in claim 5, including the steps of:
sensing achievement of a predetermined viewer response magnitude for at least one reaction type; and
flashing in said display the pictorial representation corresponding to the latter reaction type in response to achievement of said predetermined viewer response magnitude.

8. In a method of determining the reaction of television viewers to a video program displayed by different video display sets in a broadcast reception area, the improvement comprising in combination the steps of:
broadcasting said video program to said sets for display at the discretion of television viewers in said area;
providing a display of said broadcast video program;
displaying a visual graduation system in said display;
determining a relative number of said sets responding to said broadcast video program; and providing in said graduation system in said display a pictorial representation of said relative number of responding sets.

9. A method as claimed in claim 8, including the steps of:
providing potentially participating sets with a facility for registering a viewer reaction to said broadcast video program;
receiving said viewer reaction through said viewer reaction registering facility; and
providing in said display and relative to said graduation system a pictorial representation of registered viewer reactions.

10. A method as claimed in claim 8, including the steps of:
displaying a scale as said visual graduation system; and
displaying in said scale a band and adjusting the height of said band relative to said scale in terms of said relative number of responding sets.

11. A method as claimed in claim 8, including the steps of:
providing potentially participating sets with a facility for registering a viewer reaction to said broadcast video program;
receiving said viewer reaction through said viewer reaction registering facility;
displaying scales as said visual graduation system;
displaying in said scales a first band and adjusting the height of said first band relative to said scales in terms of said relative number of responding sets; and
displaying in said scales a second band and adjusting the height of said second band relative to said scales in terms of magnitude of received viewer reactions.

12. In a method of determining the reaction of television viewers to a video program displayed by different video display sets in a broadcast reception area, the improvement comprising in combination the steps of:
broadcasting said video program to said sets for display at the discretion of television viewers in said area;
providing potentially participating sets with a facility for registering any of a predetermined number of different types of viewer reactions to said broadcast video program;
providing a display of said broadcast video program;
providing said display with a facility for displaying a number of pictorial representations corresponding to said predetermined number of different types of viewer reactions for individually indicating each viewer reaction type;
receiving said types of viewer reactions through said registering facility; and
displaying in said display received viewer reactions according to reaction type through the corresponding pictorial representations.

13. A method as claimed in claim 12, including the step of:
varying at least one of said pictorial representations as a function of a viewer response magnitude.

14. A method as claimed in claim 12, including the step of:
sensing achievement of a predetermined viewer response magnitude for at least one reaction type; and flashing in said display the pictorial representation corresponding to the latter reaction type in response to achievement of said predetermined viewer response magnitude.

15. A method as claimed in claim 12, including the steps of:
displaying a visual graduation system in said display;
determining a relative number of said sets responding to said broadcast; and
providing relative to said graduation system in said display a pictorial representation of said relative number of responding sets.

16. A method as claimed in claim 15, including the steps of:
providing potentially participating sets with a facility for registering a viewer reaction to said broadcast video program;
receiving said viewer reaction through said viewer reaction registering facility; and
providing in said display and relative to said graduation system a pictorial representation of registered viewer reactions.

17. A method as claimed in claim 15, including the steps of:
displaying a scale as said visual graduation system; and
displaying in said scale a band and adjusting the height of said band relative to said scale in terms of said relative number of responding sets.

18. A method as claimed in claim 15, including the steps of:
providing potentially participating sets with a facility for registering a viewer reaction to said broadcast video program;
receiving said viewer reaction through said viewer reaction registering facility; and
displaying scales as said visual graduation system;
displaying in said scales a first band and adjusting the height of said first band relative to said scales in terms of said relative number of responding sets; and
displaying in said scales a second band and adjusting the height of said second band relative to said scales in terms of magnitude of received viewer reactions.

19. A method as claimed in claim 12, including the steps of:
displaying a visual graduation system in said display;
displaying a manifestation of at least one of said types of viewer reactions to scale in said visual graduation system.

20. A method as claimed in claim 12, including the steps of:
displaying a set of scales in said display; and
displaying in said set of scales a magnitude of at least one of said types of viewer reactions in the form of a band having a height corresponding to said magnitude.

21. In a method of determining the reaction of television viewers to a video program displayed by different video display sets in a broadcast reception area, the improvement comprising in combination the steps of:
broadcasting said video program to said sets for display at the discretion of television viewers in said area;
providing potentially participating sets with a facility for registering any of a predetermined number of different types of viewer reactions to said broadcast video program;

providing a facility for displaying to participating television viewers a number of pictorial representations corresponding to said predetermined number of different types of viewer reactions for individually indicating each viewer reaction type;

receiving said types of viewer reactions through said registering facility; and displaying to participating television viewers received viewer reactions according to reaction type through the corresponding pictorial presentations.

22. A method as claimed in claim 21, including the steps of:

determining a relative number of sets responding to said broadcast; and displaying to participating television viewers an indication of said relative number of responding sets.

23. In a method of determining the reaction of television viewers to a video program displayed by different video display sets in a broadcast reception area, the improvement comprising in combination the steps of:

broadcasting said video program to said sets for display at the discretion of television viewers in said area;

determining a relative number of said sets responding to said broadcast; and displaying to participating television viewers an indication of said relative number of responding sets.

24. In a system for determining the reaction of television viewers to a video program displayed by different video display sets in a broadcast reception area, the improvement comprising in combination:

means for broadcasting said video program to said sets for display at the discretion of television viewers in said area;

for providing a display of said broadcast video program;

means operatively associated with said sets for determining a relative number of said sets responding to said broadcast video program; and means operatively associated with said determining means and said display means for providing in said display a pictorial representation of said relative number of responding sets.

25. A system as claimed in claim 24, including:

means connected to said display means and pictorial display providing means for recording said display of said broadcast video program together with said pictorial representation for subsequent evaluation.

26. A system as claimed in claim 25, including:

means for playing back and displaying said display of said broadcast video program together with said pictorial representation.

27. A system as claimed in claim 24, including:

means operatively associated with potentially participating sets for registering a viewer reaction to said broadcast video program; and means operatively associated with said registering means and said display means for providing in said display a pictorial representation of registered viewer reactions.

28. A system as claimed in claim 24, including:

means operatively associated with potentially participating sets for registering any of a predetermined number of different types of viewer reactions to said broadcast video program;

means operatively associated with said display means for displaying a number of pictorial representations corresponding to said predetermined number of different types of viewer reactions for individually indicating each viewer reaction type; and means operatively associated with said registering means and said pictorial representations displaying means for displaying registered viewer reactions according to reaction type through the corresponding pictorial representations.

29. A system as claimed in claim 28, including:

means connected to said viewer reactions displaying means for varying at least one of said pictorial representations as a function of a viewer response magnitude.

30. A system as claimed in claim 28, including:

means operatively associated with said registering means for sensing achievement of a predetermined viewer response magnitude for at least one reaction type; and means connected to said sensing means and said viewer reactions displaying means for flashing the pictorial representation corresponding to the latter reaction type in response to achievement of said predetermined viewer response magnitude.

31. In a system for determining the reaction of television viewers to a video program displayed by different video display sets in a broadcast reception area, the improvement comprising in combination:

means for broadcasting said video program to said sets for display at the discretion of television viewers in said area;

means operatively associated with said broadcasting means for providing a display of said broadcast video program;

means operatively associated with said display means for displaying a visual graduation system in said display;

means operatively associated with said sets for determining a relative number of said sets responding to said broadcast video program; and means operatively associated with said determining means and said display means for displaying in said graduation system a pictorial representation of said relative number of responding sets.

32. A system as claimed in claim 31, including:

means operatively associated with potentially participating sets for registering an extreme viewer reaction to said broadcast video program; and means operatively associated with said display means for displaying relative to said graduation system a pictorial representation of registered viewer reactions.

33. A system as claimed in claim 31, wherein:

said graduation system displaying means include means for displaying a scale in said display; and said pictorial representation displaying means include means for displaying in said scale a band and for adjusting the height of said band relative to said scale in terms of said relative number of responding sets.

34. A system as claimed in claim 31, wherein:

said system includes means operatively associated with potentially participating sets for registering a viewer reaction to said broadcast video program;

said graduation system displaying means include means for displaying scales; and said pictorial representation displaying means include means for displaying in said scales a first band and adjusting the height of said first band relative to said scales in terms of said relative number of responding sets and means for displaying in said scales a second band and adjusting the height of said second band relative to said scales in terms of magnitude of registered viewer reactions.

35. In a system for determining the reaction of television viewers to a video program displayed by different video display sets in a broadcast reception area, the improvement comprising in combination:
means for broadcasting said video program to said sets for display at the discretion of television viewers in said area;
means operatively associated with potentially participating sets for registering any of a predetermined number of different types of viewer reactions to said broadcast video program;
means operatively associated with said broadcasting means for providing a display of said broadcast video program;
means operatively associated with said display means for displaying a number of pictorial representations corresponding to said predetermined number of different types of viewer reactions for individually indicating each viewer reaction type; and
means operatively associated with said registering means and said pictorial representations displaying means for displaying registered viewer reactions according to reaction type through the corresponding pictorial representations.

36. A system as claimed in claim 35, including:
means connected to said viewer reactions display means for varying at least one of said pictorial representations as a function of a viewer response magnitude.

37. A system as claimed in claim 35, including:
means operatively associated with said registering means for sensing achievement of a predetermined viewer response magnitude for at least one reaction type; and
means connected to said sensing means and said viewer reaction display means for flashing in said display the pictorial representation corresponding to the latter reaction type in response to achievement of said predetermined viewer response magnitude.

38. A system as claimed in claim 35, including:
means for displaying a visual graduation system in said display;
means operatively associated with said sets for determining a relative number of said sets responding to said broadcast; and
means operatively associated with said display means for providing relative to said graduation system in said display a pictorial representation of said relative number of responding sets.

39. A system as claimed in claim 38, including:
means operatively associated with potentially participating sets for registering a viewer reaction to said broadcast video program; and
means operatively associated with said display means for displaying relative to said graduation system a pictorial representation of registered viewer reactions.

40. A system as claimed in claim 38, including:
means for displaying a scale in said display; and
means operatively associated with said display means for displaying in said scale a band and adjusting the height of said band relative to said scale in terms of said relative number of responding sets.

41. A system as claimed in claim 38, wherein:
said system includes means operatively associated with potentially participating sets for registering a viewer reaction to said broadcast video program;
said graduation system displaying means include means for displaying scales; and
said pictorial representation displaying means include means for displaying in said scales a first band and adjusting the height of said first band relative to said scales in terms of said relative number of responding sets and means for displaying in said scales a second band and adjusting the height of said second band relative to said scales in terms of magnitude of registered viewer reactions.

42. A system as claimed in claim 35, including:
means for displaying a visual graduation system in said display;
means operatively associated with said display means for displaying a manifestation of at least one of said types of viewer reactions to scale in said visual graduation system.

43. A system as claimed in claim 35, including:
means for displaying a set of scales in said display; and
means operatively associated with said display means for displaying in said set of scales a magnitude of at least one of said types of viewer reactions in the form of a band having a height corresponding to said magnitude.

44. In a system of determining the reaction of television viewers to a video program displayed by different video display sets in a broadcast reception area, the improvement comprising in combination:
means for broadcasting said video program to said sets for display at the discretion of television viewers in said area;
means operatively associated with potentially participating sets for registering any of a predetermined number of different types of viewer reactions to said broadcast video program; and
means operatively associated with said registering means for displaying to participating television viewers a number of pictorial representations corresponding to said predetermined number of different types of viewer reactions for individually indicating each viewer reaction type, said displaying means including means for displaying to participating television viewers received viewer reactions according to reaction type through the corresponding pictorial presentations.

45. A system as claimed in claim 44, including:
means operatively associated with said sets for determining a relative number of sets responding to said broadcast; and
means for displaying to participating television viewers an indication of said relative number of responding sets.

46. In a system for determining the reaction of television viewers to a video program displayed by different video display sets in a broadcast reception area, the improvement comprising in combination:
means for broadcasting said video program to said sets for display at the discretion of television viewers in said area;

means operatively associated with said sets for determining a relative number of said sets responding to said broadcast; and means operatively associated with said determining means for displaying to participating television viewers an indication of said relative number of responding sets.

47. In a system for determining the reaction of television viewers to a video program displayed by different video display sets in a broadcast reception area, the improvement comprising in combination:

means for broadcasting said video program over a predetermined television channel to said sets for display at the discretion of television viewers in said area;

channel selector means at each potentially participating set for selectively receiving said video program broadcast over said predetermined television channel for display by the particular set;

means operatively associated with each potentially participating set for registering different types of viewer reactions to a video program display by the particular set, said registering means including first means in addition to said channel selector means for registering a first type of television viewer reaction to a video program display by the particular set, and second means in addition to said channel selector means and said first means for registering a second type of television viewer reaction to a video program display by the particular set;

means coupled to the second means for altering in response to a second type of television viewer reaction registered with respect to a video program display by a particular set the display of that video program by the particular set; and means operatively associated with the viewer reactions registering means of participating sets for separately displaying indications of registered first and second types of television viewer reaction.

48. A system as claimed in claim 47, wherein:

said means for separately displaying said indications include means for displaying said broadcast video program, and means coupled to said displaying means for displaying together with said broadcast video program separate indications of registered first and second types of viewer reactions.

49. A system as claimed in claim 47, wherein:

said means for separately displaying said indications include means for displaying said broadcast video program, and means coupled to said displaying means for displaying a first pictorial representation of registered first types of viewer reactions, and a second pictorial representation of registered second types of viewer reactions.

* * * * *